United States Patent
Teh

(10) Patent No.: US 8,854,024 B2
(45) Date of Patent: Oct. 7, 2014

(54) POWER SUPPLY CIRCUIT

(75) Inventor: Chen Kong Teh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 13/052,350

(22) Filed: Mar. 21, 2011

(65) Prior Publication Data

US 2012/0119719 A1    May 17, 2012

(30) Foreign Application Priority Data

Nov. 17, 2010    (JP) .................................. 2010-256798

(51) Int. Cl.
    *H02M 3/158*    (2006.01)
    *H02M 1/00*    (2006.01)

(52) U.S. Cl.
    CPC .......... *H02M 3/1588* (2013.01); *Y02B 70/1466* (2013.01); *H02M 2001/0012* (2013.01)
    USPC ....................................................... 323/282

(58) Field of Classification Search
    USPC ............................ 323/265, 273, 282–285, 351
    See application file for complete search history.

(56) References Cited

U.S. PATENT DOCUMENTS

| 5,079,498 | A  | * | 1/1992 | Cleasby et al. | ................ | 323/283 |
| 6,441,690 | B1 | * | 8/2002 | Savelli et al. | ................. | 331/1 A |
| 6,606,044 | B2 | * | 8/2003 | Roeckner et al. | .............. | 341/143 |
| 7,511,465 | B2 | * | 3/2009 | Xiao et al. | ..................... | 323/283 |
| 8,036,000 | B2 | * | 10/2011 | Ying et al. | ................. | 363/21.02 |
| 8,085,024 | B2 | * | 12/2011 | Prodic et al. | ................... | 323/283 |
| 8,482,271 | B2 | * | 7/2013 | Prodic et al. | ................... | 323/285 |
| 2003/0234736 | A1 | * | 12/2003 | Tachibana et al. | ............ | 341/172 |
| 2007/0182610 | A1 | * | 8/2007 | Latham et al. | ................ | 341/143 |
| 2008/0098254 | A1 | * | 4/2008 | Altevogt et al. | .............. | 713/600 |

FOREIGN PATENT DOCUMENTS

| JP | 2005-512493 | 4/2005 |
| JP | 2009-100607 | 5/2009 |
| JP | 2010-520669 | 6/2010 |
| WO | 03050637 A2 | 6/2003 |
| WO | 2008106458 A1 | 9/2008 |

OTHER PUBLICATIONS

Olivier Trescases, et al., "A Low-Power Mixed-Signal Current-Mode DC-DC Converter Using a One-Bit DAC", IEEE, 2006, pp. 700-704.
Japanese Office Action issued on Feb. 4, 2014 in corresponding Japanese Application No. 2010-256798, along with English translation.

* cited by examiner

*Primary Examiner* — Adolf Berhane
(74) *Attorney, Agent, or Firm* — White & Case LLP

(57) ABSTRACT

According to one embodiment, a power supply circuit includes a switching control unit that compares a DA converted value of the high order bit of a digital compensation value calculated from an output voltage of a smoothing circuit with a detection value of a current flowing into the smoothing circuit and controls the switching of a switching element on the basis of a signal obtained by shifting the timing of the comparison result on the basis of the low order bit of the digital compensation value.

18 Claims, 20 Drawing Sheets

○ MEASURED VALUE
● INTERPOLATION VALUE

POWER SUPPLY CIRCUIT

CROSS-REFERENCE TO RELATED APPLICATIONS

This application is based upon and claims the benefit of priority from the prior Japanese Patent Application No. 2010-256798, filed on Nov. 17, 2010; the entire contents of which are incorporated herein by reference.

FIELD

Embodiments described herein relate generally to a power supply circuit.

BACKGROUND

As a method of performing digital control on a DC voltage generated by a switching power supply, there are a duty mode and a current mode. The current mode has a good response and easily achieves a multi-phase in which a current is distributed to each phase, as compared to the duty mode.

In the current mode, the inductor current of the switching power supply is compared with the digital compensation value of an output voltage. Therefore, when the accuracy of a DA converter is low, oscillation (limit cycle) occurs in the output of the switching power supply.

DETAILED DESCRIPTION

In general, according to one embodiment, a power supply circuit includes a switching element, a smoothing circuit, and a switching control unit. The switching element divides a direct current. The smoothing circuit smoothes the direct current divided by the switching element. The switching control unit compares the DA converted value of the high order bit of a digital compensation value calculated from the output voltage of the smoothing circuit with the detection value of the current flowing into the smoothing circuit and controls the switching of the switching element on the basis of a signal obtained by shifting the timing of the comparison result on the basis of the low order bit of the digital compensation value.

Hereinafter, exemplary embodiments of power supply circuits will be explained below in detail with reference to the accompanying drawings. The present invention is not limited to the following embodiments.

First Embodiment

Figure 1:
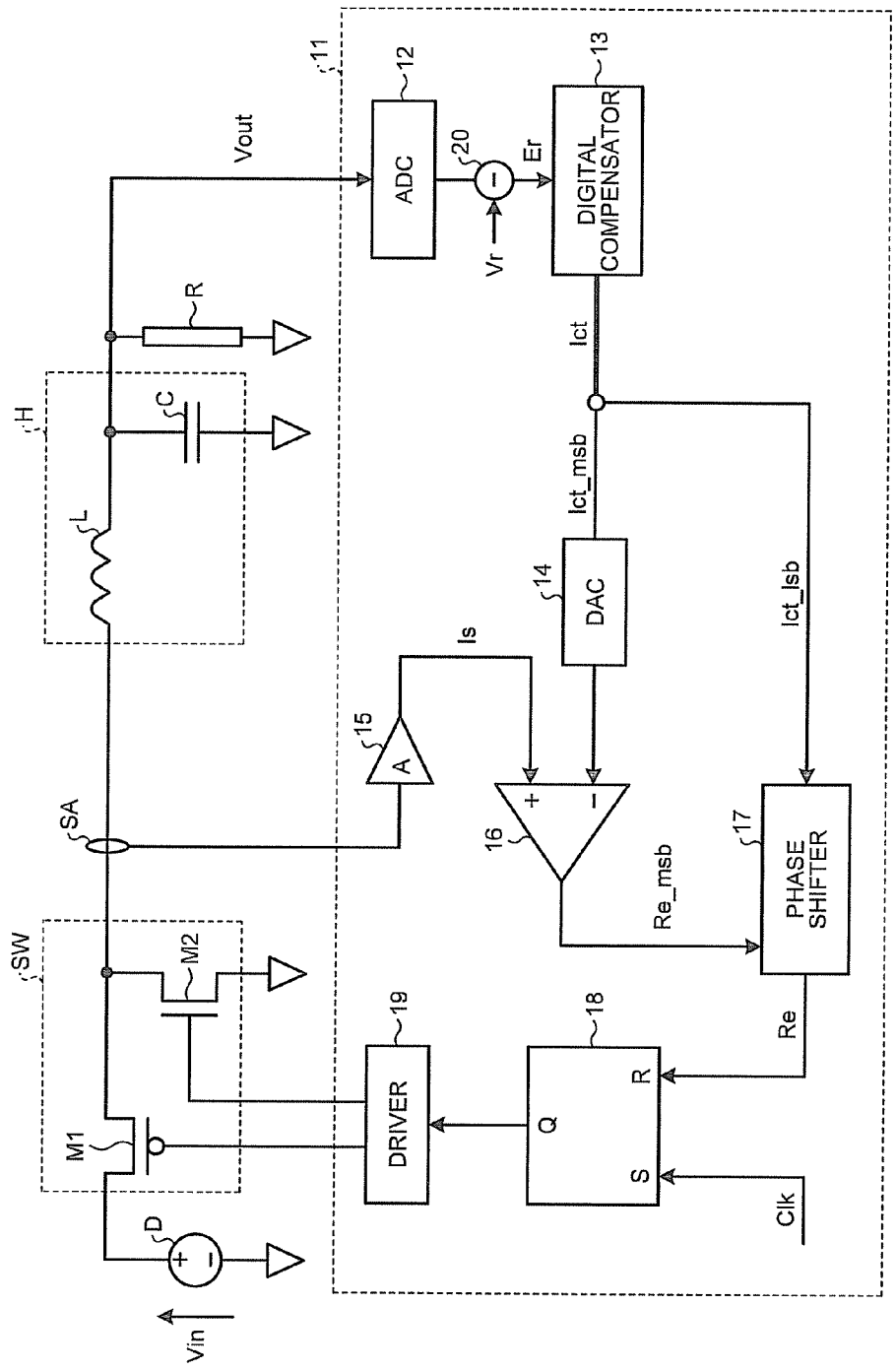
FIG. 1 is a block diagram illustrating the schematic structure of a power supply circuit according to a first embodiment.

FIG. 1 is a block diagram illustrating the schematic structure of a power supply circuit according to a first embodiment.

In FIG. 1, the power supply circuit includes a switching element SW, a smoothing circuit H, and a switching control unit 11. In addition, a current sensor SA that detects a current flowing into the smoothing circuit H is provided between the switching element SW and the smoothing circuit H.

The switching element SW can divide the direct current generated by a direct current power supply D and includes a p-channel field effect transistor M1 and an n-channel field effect transistor M2.

The smoothing circuit H can smooth the direct current divided by the switching element SW and includes an inductor L and a capacitor C.

The source of the p-channel field effect transistor M1 is connected to the direct current power supply D, and the drain of the p-channel field effect transistor M1 is connected to the drain of the n-channel field effect transistor M2. The source of the n-channel field effect transistor M2 is connected to the ground. The gate of the p-channel field effect transistor M1 and the gate of the n-channel field effect transistor M2 are connected to a driver 19.

The drain of the n-channel field effect transistor M2 is connected to one end of the inductor L, and the other end of the inductor L is connected to one end of the capacitor C. The other end of the capacitor C is connected to the ground. A load R is connected in parallel to the capacitor C.

The switching control unit 11 compares the DA converted value of the high order bit Ict_msb of a digital compensation value Ict calculated from the output voltage Vout of the smoothing circuit H with the detection value Is of the current flowing into the smoothing circuit H and controls the switching of the switching element SW on the basis of a reset signal Re obtained by shifting the comparison result on the basis of the low order bit Ict_lsb of the digital compensation value Ict.

The switching control unit 11 includes an AD converter 12 that performs AD conversion on the output voltage Vout of the smoothing circuit H, a subtractor 20 that subtracts a reference voltage Vr from the output voltage Vout to calculate an error signal Er, a digital compensator 13 that compensates the error signal Er to calculate the digital compensation value Ict, a DA converter 14 that performs DA conversion on the high order bit Ict_msb of the digital compensation value Ict, an amplifier 15 that amplifies the value detected by the current sensor SA and outputs a detection value Is, a comparator 16 that compares the DA converted value of the high order bit Ict_msb with the detection value Is, a phase shifter 17 that shifts the phase of the comparison result Re_msb of the comparator 16 on the basis of the low order bit Ict_lsb of the digital compensation value Ict, a flip-flop 18 that performs a reset operation on the basis of a reset signal Re output from the phase shifter 17, and the driver 19 that drives the p-channel field effect transistor M1 and the n-channel field effect transistor M2 on the basis of the output Q of the flip-flop 18.

The AD converter 12 performs AD conversion on the output voltage Vout of the smoothing circuit H and the subtractor 20 subtracts the reference voltage Vr from the converted value to calculate the error signal Er and outputs the error signal Er to the digital compensator 13. The digital compensator 13 calculates the digital compensation value Ict such that the error signal Er is close to 0. The high order bit Ict_msb of the digital compensation value Ict is output to the DA converter 14 and the low order bit Ict_lsb of the digital compensation value Ict is output to the phase shifter 17. The digital compensator 13 may perform, for example, PID control in order to calculate the digital compensation value Ict. The DA converter 14 performs DA conversion on the high order bit Ict_msb of the digital compensation value Ict and outputs the conversion result to the comparator 16.

The current sensor SA detects the current flowing into the smoothing circuit H, and the amplifier 15 amplifies the value detected by the current sensor SA to generate the detection value Is and outputs the detection value Is to the comparator 16.

The comparator 16 compares the DA converted value of the high order bit Ict_msb with the detection value Is and outputs the comparison result Re_msb to the phase shifter 17. The phase shifter 17 shifts the output timing of the comparison result Re_msb of the comparator 16 on the basis of the low order bit Ict_lsb of the digital compensation value Ict to generate the reset signal Re and outputs the reset signal Re to a reset terminal R of the flip-flop 18.

A clock signal Clk is input to a set terminal S of the flip-flop 18, and the output Q of the flip-flop 18 is input to the driver 19. The driver 19 drives the p-channel field effect transistor M1 and the n-channel field effect transistor M2 on the basis of the output Q of the flip-flop 18 to turn on/off the p-channel field effect transistor M1 and the n-channel field effect transistor M2.

When the p-channel field effect transistor M1 is turned on, the n-channel field effect transistor M2 is turned off and a current is supplied from the direct current power supply D to the capacitor C through the p-channel field effect transistor M1. As a result, the output voltage Vout increases.

When the p-channel field effect transistor M1 is turned off, the n-channel field effect transistor M2 is turned on and the charge stored in the capacitor C is discharged through the n-channel field effect transistor M2. As a result, the output voltage Vout is reduced.

Since the DA converter 14 compares the high order bit Ict_msb of the digital compensation value Ict with the detection value Is, it is not necessary to use a high-accuracy DA converter 14. In addition, since the timing of the comparison result Re_msb of the comparator 16 is shifted in a very small step on the basis of the low order bit Ict_lsb of the digital compensation value Ict, it is possible to improve the temporal resolution of the reset signal Re and reduce the oscillation of the output Vout of the power supply circuit operated in the current mode.

Figure 2:
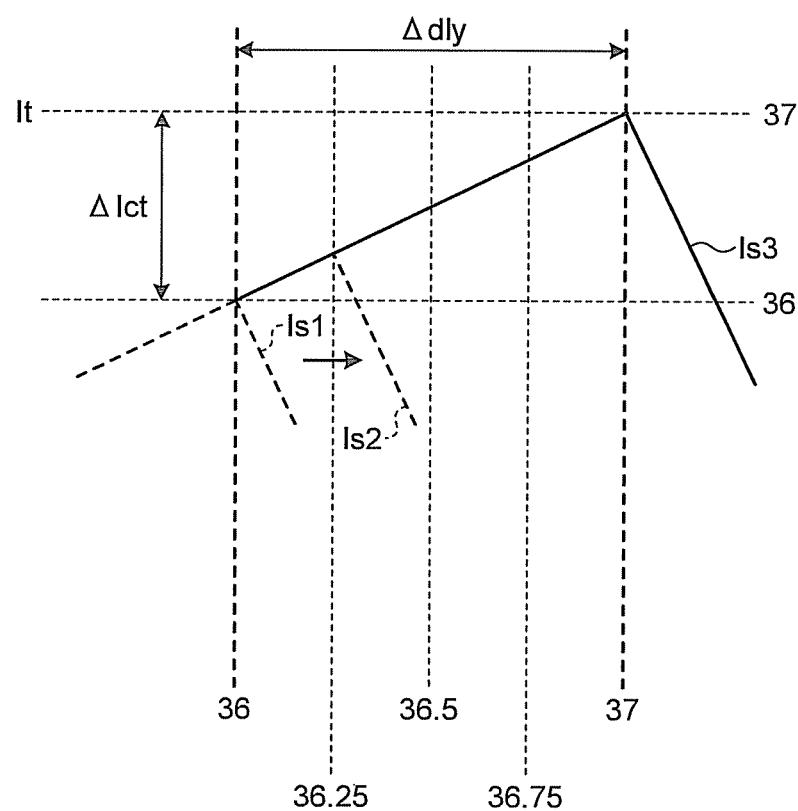
FIG. 2 is a diagram illustrating the relationship between a current detection value Is and a current command value It of the power supply circuit shown in FIG. 1.

FIG. 2 is a diagram illustrating the relationship between the current command value It and the current detection value Is of the power supply circuit shown in FIG. 1.

In FIG. 2, when the p-channel field effect transistor M1 is turned on and the n-channel field effect transistor M2 is turned off, the detection value Is linearly increases. When the p-channel field effect transistor M1 is turned off and the n-channel field effect transistor M2 is turned on, the detection value Is is linearly reduced. Therefore, the waveform of the detection value Is becomes a triangle wave and the detection value Is is locally linear.

The digital compensation value Ict is a discrete value and the difference between the high and low levels of the DA converted value of the digital compensation value Ict is $\Delta$Ict. The time delay required for the detection value Is to be increased by the difference $\Delta$Ict of the DA converted value is $\Delta$dly. Since the detection value Is is locally linear, the difference $\Delta$Ict of the DA converted value is proportional to the delay time $\Delta$dly.

For example, when the digital compensation value Ict is 36, the comparison result Re_msb of the comparator 16 rises at the time when the detection value Is is 36. When the flip-flop 18 is reset using the comparison result Re_msb of the comparator 16, the detection value Is is reduced at the time when the detection value Is is 36 (Is1).

For example, when the digital compensation value Ict is 37, the comparison result Re_msb of the comparator 16 rises at the time when the detection value Is is 37. When the flip-flop 18 is reset using the comparison result Re_msb of the comparator 16, the detection value Is is reduced at the time when the detection value Is is 37 (Is3).

Therefore, in a method of resetting the flip-flop 18 using the comparison result Re_msb of the comparator 16, when the digital compensation value Ict is actually 36.25 due to bit extension, an error occurs during the time when the flip-flop 18 is reset by the difference.

In a method of resetting the flip-flop 18 on the basis of the reset signal Re output from the phase shifter 17, for example, even when the digital compensation value Ict is 36.25, the difference $\Delta$Ict (0.25) is corrected by the phase shifter 17, and it is possible to improve the temporal resolution of the reset signal Re.

Second Embodiment

Figure 3:
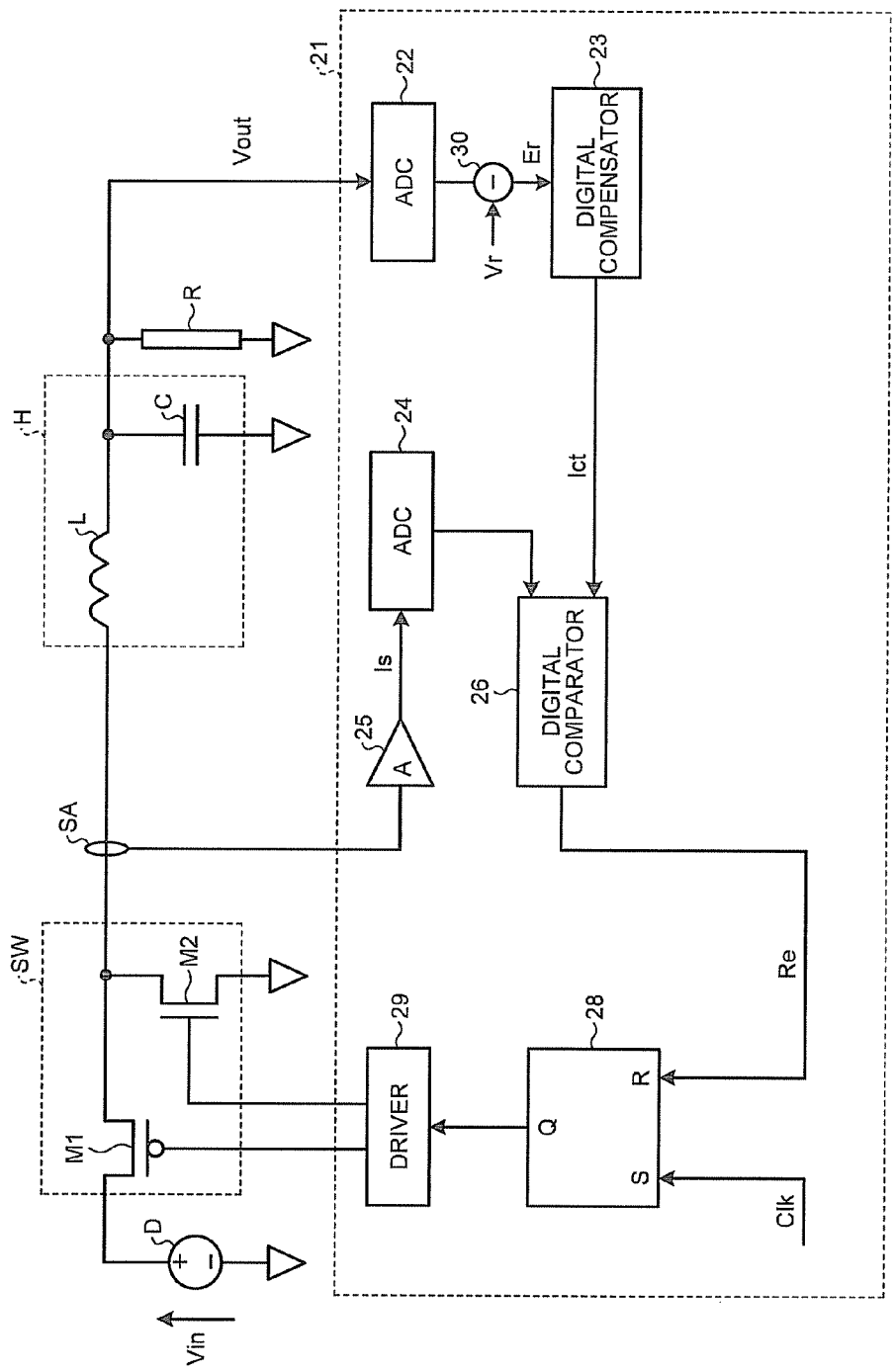
FIG. 3 is a block diagram illustrating the schematic structure of a power supply circuit according to a second embodiment.

FIG. 3 is a block diagram illustrating the schematic structure of a power supply circuit according to a second embodiment.

In FIG. 3, the power supply circuit includes a switching control unit 21 instead of the switching control unit 11 of the power supply circuit shown in FIG. 1.

The switching control unit 21 can control the switching of the switching element SW on the basis of the comparison result between the digital compensation value Ict calculated from the output voltage Vout of the smoothing circuit H and the AD converted value of the detection value Is of the current flowing into the smoothing circuit H.

The switching control unit 21 includes an AD converter 22 that performs AD conversion on the output voltage Vout of the smoothing circuit H, a subtractor 30 that subtracts the reference voltage Vr from the AD converted output voltage Vout to calculate the error signal Er, a digital compensator 23 that compensates the error signal Er to calculate the digital compensation value Ict, an amplifier 25 that amplifies the value detected by the current sensor SA and outputs the detection value Is, an AD converter 24 that performs AD conversion on the detection value Is, a comparator 26 that compares the digital compensation value Ict with the detection value Is, a flip-flop 28 that performs a reset operation on the basis of the reset signal Re output from the comparator 26, and a driver 29 that drives the p-channel field effect transistor M1 and the n-channel field effect transistor M2 on the basis of the output Q of the flip-flop 28.

The AD converter 22 AD conversion on the output voltage Vout of the smoothing circuit H and the subtractor 30 subtracts the reference voltage Vr from the converted value to calculate the error signal Er and outputs the error signal Er to the digital compensator 23. The digital compensator 23 calculates the digital compensation value Ict such that the error signal Er is close to 0 and outputs the digital compensation value Ict to the comparator 26.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and outputs the conversion result to the comparator 26.

The comparator 26 compares the digital compensation value Ict with the AD converted value of the detection value Is to generate the reset signal Re and outputs the comparison result to the reset terminal R of the flip-flop 28.

In this way, it is possible to compare the digital compensation value Ict with the detection value Is without performing DA conversion on the digital compensation value Ict. A DA converter for performing DA conversion on the digital compensation value Ict is not needed and it is possible to improve the robustness of a circuit. In addition, since the digital comparison circuit 26 is used instead of the analog comparison circuit 16, it is possible to reduce power consumption.

Third Embodiment

Figure 4:
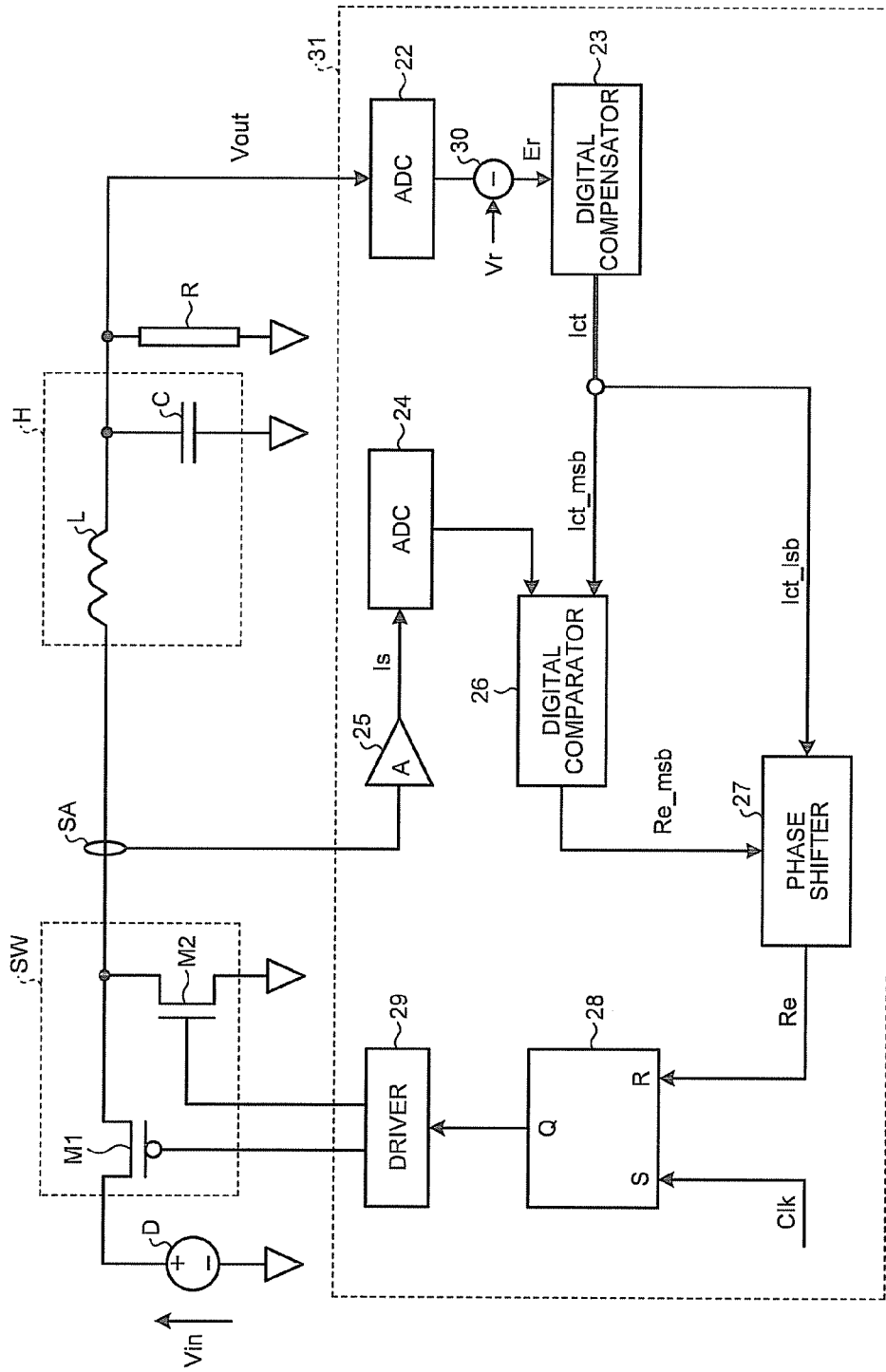
FIG. 4 is a block diagram illustrating the schematic structure of a power supply circuit according to a third embodiment.

FIG. 4 is a block diagram illustrating the schematic structure of a power supply circuit according to a third embodiment.

In FIG. 4, the power supply circuit includes a switching control unit 31 instead of the switching control unit 21 of the power supply circuit shown in FIG. 3.

The switching control unit 31 can compare the high order bit Ict_msb of the digital compensation value Ict calculated from the output voltage Vout of the smoothing circuit H with the AD converted value of the detection value of the current Is flowing into the smoothing circuit H and control the switching of the switching element SW on the basis of the reset signal Re obtained by shifting the comparison result on the basis of the low order bit Ict_lsb of the digital compensation value Ict.

The switching control unit 31 additionally includes a phase shifter 27, as compared to the switching control unit 21 shown in FIG. 3. The phase shifter 27 can shift the phase of the comparison result Re_msb of the comparator 26 on the basis of the low order bit Ict_lsb of the digital compensation value Ict.

The AD converter 22 performs AD conversion on the output voltage Vout of the smoothing circuit H and the subtractor 30 subtracts the reference voltage Vr from the AC converted value to calculate the error signal Er and outputs the error signal Er to the digital compensator 23. The digital compensator 23 calculates the digital compensation value Ict such that the error signal Er is closed to 0. The high order bit Ict_msb of the digital compensation value Ict is output to the comparator 26 and the low order bit Ict_lsb of the digital compensation value Ict is output to the phase shifter 27.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and outputs the converted detection value to the comparator 26.

The comparator 26 compares the high order bit Ict_msb with the AD converted value of the detection value Is and outputs the comparison result Re_msb to the phase shifter 27. The phase shifter 27 shifts the output timing of the comparison result Re_msb of the comparator 26 on the basis of the low order bit Ict_lsb of the digital compensation value Ict to generate the reset signal Re and outputs the reset signal Re to the reset terminal R of the flip-flop 28.

In this way, it is not necessary to perform DA conversion on the digital compensation value Ict and a DA converter for performing DA conversion on the digital compensation value Ict is not needed. In addition, it is possible to improve the temporal resolution of the reset signal Re and reduce the oscillation of the output Vout of the power supply circuit operated in the current mode while improving the robustness of a circuit.

Figure 5:
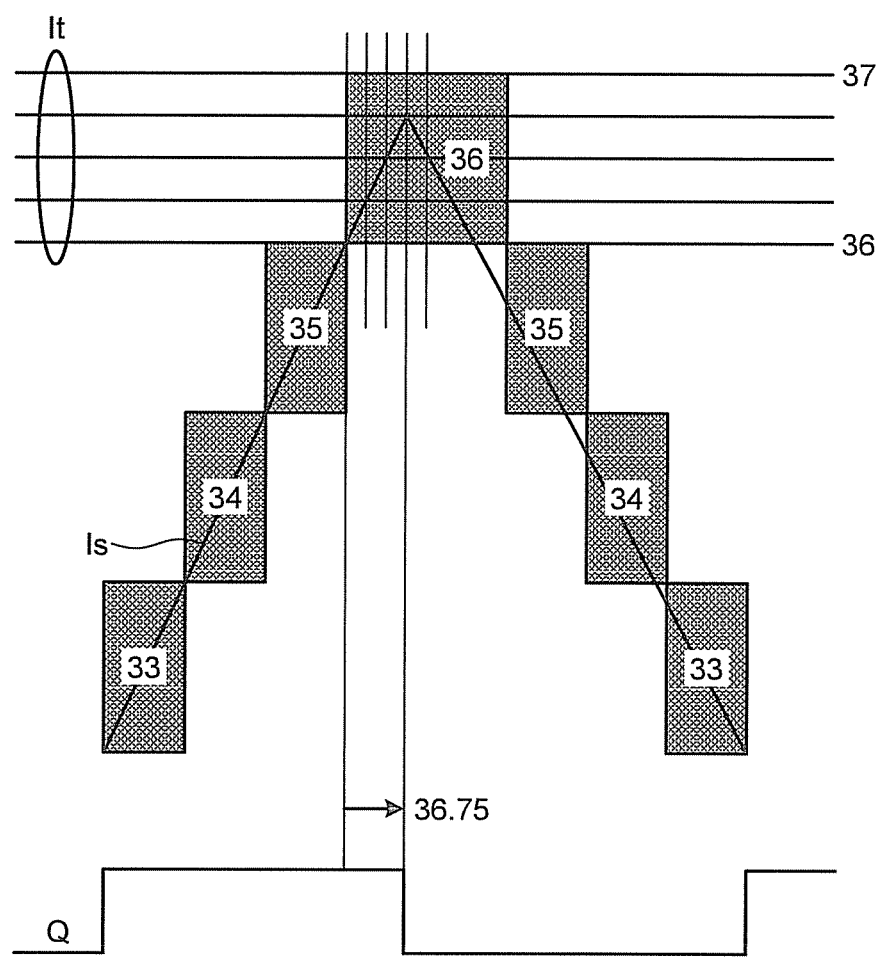
FIG. 5 is a diagram illustrating the relationship between a current detection value Is and a current command value It of the power supply circuit shown in FIG. 4.

FIG. 5 is a diagram illustrating the relationship between the current detection value Is and the current command value It of the power supply circuit shown in FIG. 4.

In FIG. 5, the AD converted value of the detection value Is is a discrete value. For example, when the digital compensation value Ict is 36, the comparison result Re_msb of the comparator 26 rises at the time when the detection value Is is 36. When the flip-flop 28 is reset using the comparison result Re_msb of the comparator 26, the detection value Is is reduced at the time when the detection value Is is 36.

Therefore, in a method of resetting the flip-flop 28 using the comparison result Re_msb of the comparator 26, when the digital compensation value Ict is actually 36.75 due to bit extension, an error occurs during the time when the flip-flop 28 is reset by the difference.

In a method of resetting the flip-flop 28 on the basis of the reset signal Re output from the phase shifter 27, for example, even when the digital compensation value Ict is 36.75, the difference ΔIct (0.75) is corrected by the phase shifter 27, and it is possible to improve the temporal resolution of the reset signal Re.

Fourth Embodiment

Figure 6:
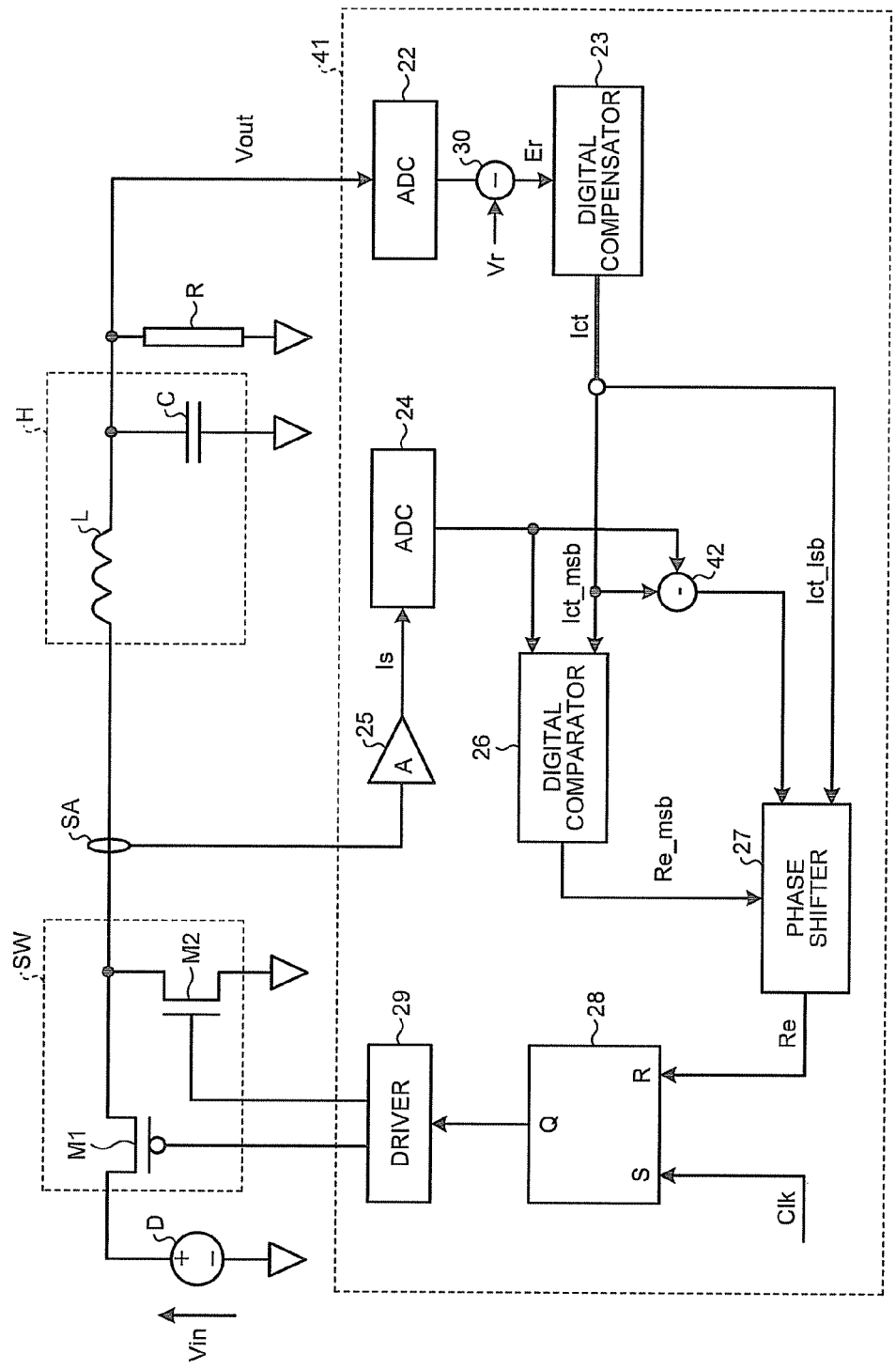
FIG. 6 is a block diagram illustrating the schematic structure of a power supply circuit according to a fourth embodiment.

FIG. 6 is a block diagram illustrating the schematic structure of a power supply circuit according to a fourth embodiment.

In FIG. 6, the power supply circuit includes a switching control unit 41 instead of the switching control unit 31 of the power supply circuit shown in FIG. 4.

The switching control unit 41 can shift the comparison result of the comparator 26 on the basis of the low order bit Ict_lsb of the digital compensation value Ict and the subtraction result between the AD converted value of the detection value Is of the current and the high order bit Ict_msb of the digital compensation value Ict.

The switching control unit 41 additionally includes a subtractor 42, as compared to the switching control unit 31 shown in FIG. 4. The subtractor 42 can subtract the AD converted value of the detection value Is from the high order bit Ict_msb of the digital compensation value Ict.

The AD converter 22 performs AD conversion on the output voltage Vout of the smoothing circuit H and the subtractor 30 subtracts the reference voltage Vr from the converted value to calculate the error signal Er and outputs the error signal Er to the digital compensator 23. The digital compensator 23 calculates the digital compensation value Ict such that the error signal Er is close to 0. The high order bit Ict_msb of the digital compensation value Ict is output to the comparator 26 and the subtractor 42 and the low order bit Ict_lsb of the digital compensation value Ict is output to the phase shifter 27.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and outputs the converted value to the comparator 26 and the subtractor 42.

The comparator 26 compares the high order bit Ict_msb with the AD converted value of the detection value Is and outputs the comparison result Re_msb to the phase shifter 27. The subtractor 42 subtracts the AD converted value of the detection value Is from the high order bit Ict_msb of the digital compensation value Ict and outputs the subtraction result to the phase shifter 27. The phase shifter 27 shifts the output timing of the comparison result Re_msb of the comparator 26 on the basis of the low order bit Ict_lsb of the digital compensation value Ict and the subtraction result of the subtractor 42 to generate the reset signal Re and outputs the reset signal Re to the reset terminal R of the flip-flop 28.

In this way, the phase shifter 27 can shift the output timing of the comparison result Re_msb of the comparator 26 by the difference between the high order bit Ict_msb of the digital compensation value Ict and the AD converted value of the detection value Is in addition to the low order bit Ict_lsb of the digital compensation value Ict. Therefore, even when the detection value Is is greatly changed, the amount of shift by the phase shifter 27 can follow the detection value Is and it is possible to reduce the oscillation of the output Vout of the power supply circuit operated in the current mode.

Fifth Embodiment

Figure 7:
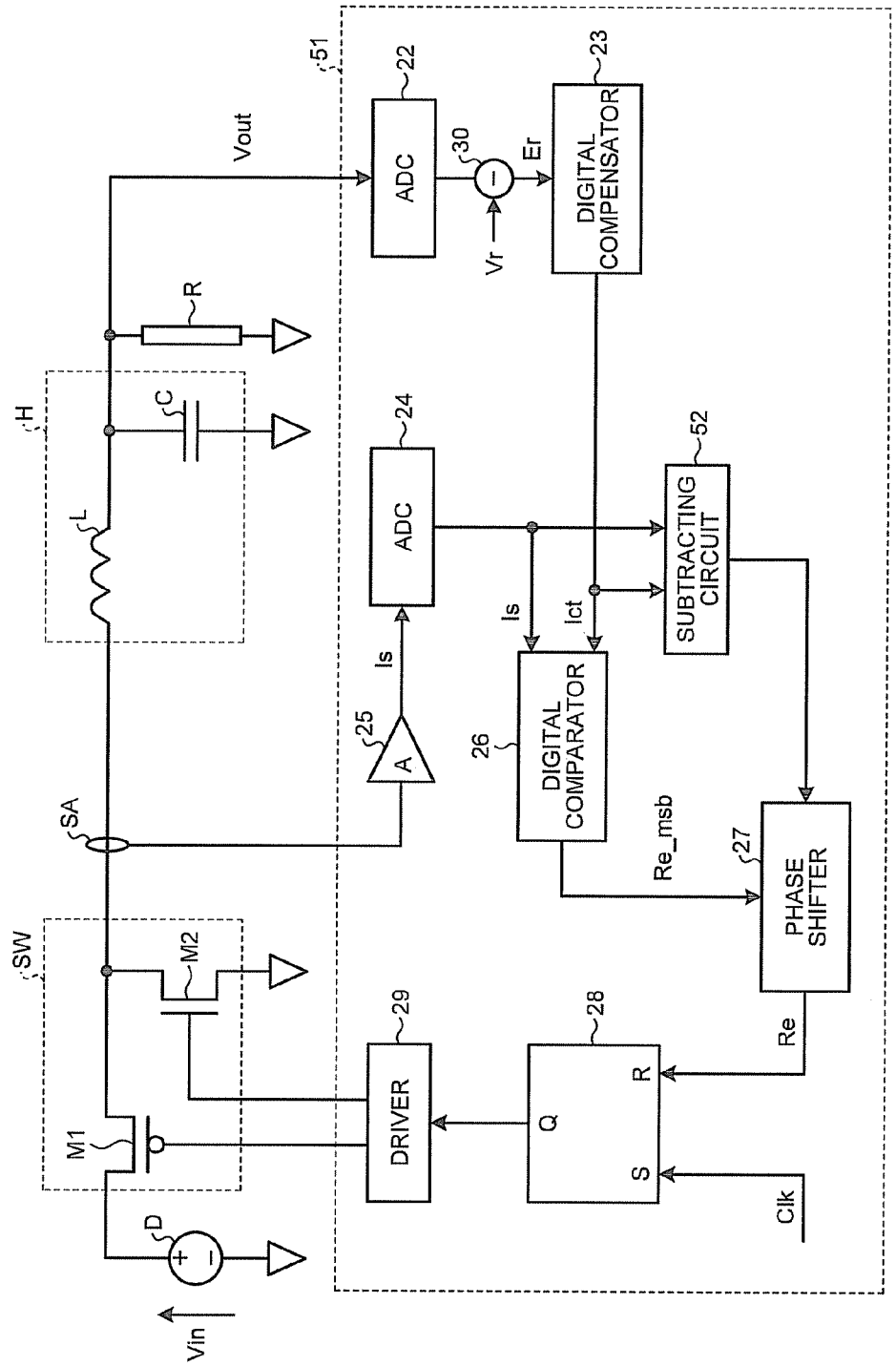
FIG. 7 is a block diagram illustrating the schematic structure of a power supply circuit according to a fifth embodiment.

FIG. 7 is a block diagram illustrating the schematic structure of a power supply circuit according to a fifth embodiment.

In FIG. 7, the power supply circuit includes a switching control unit 51 instead of the switching control unit 41 of the power supply circuit shown in FIG. 6. The switching control unit 51 includes a subtracting circuit 52 instead of the subtractor 42 shown in FIG. 6. The subtracting circuit 52 can subtract the AD converted value of the detection value Is from the digital compensation value Ict.

The AD converter 22 performs AD conversion on the output voltage Vout of the smoothing circuit H and the subtractor 30 subtracts the reference voltage Vr from the converted value to calculate the error signal Er and outputs the error signal Er to the digital compensator 23. The digital compensator 23 calculates the digital compensation value Ict such that the error signal Er is close to 0 and outputs the digital compensation value Ict to the comparator 26 and the subtracting circuit 52.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and outputs the converted value to the comparator 26 and the subtracting circuit 52.

The comparator 26 compares the digital compensation value Ict with the AD converted value of the detection value Is and outputs the comparison result Re_msb to the phase shifter 27. The subtracting circuit 52 subtracts the AD converted value of the detection value Is from the digital compensation value Ict and outputs the subtraction result to the phase shifter 27. The phase shifter 27 shifts the output timing of the comparison result Re_msb of the comparator 26 on the basis of the subtraction result of the subtracting circuit 52 to generate the reset signal Re and outputs the reset signal Re to the reset terminal R of the flip-flop 28.

In this way, the phase shifter 27 can shift the output timing of the comparison result Re_msb by the difference between the digital compensation value Ict and the AD converted value of the detection value Is. Therefore, even when the detection value Is is greatly changed, the amount of shift by the phase shifter 27 can follow the detection value Is and it is possible to reduce the oscillation of the output Vout of the power supply circuit operated in the current mode.

Figure 8:
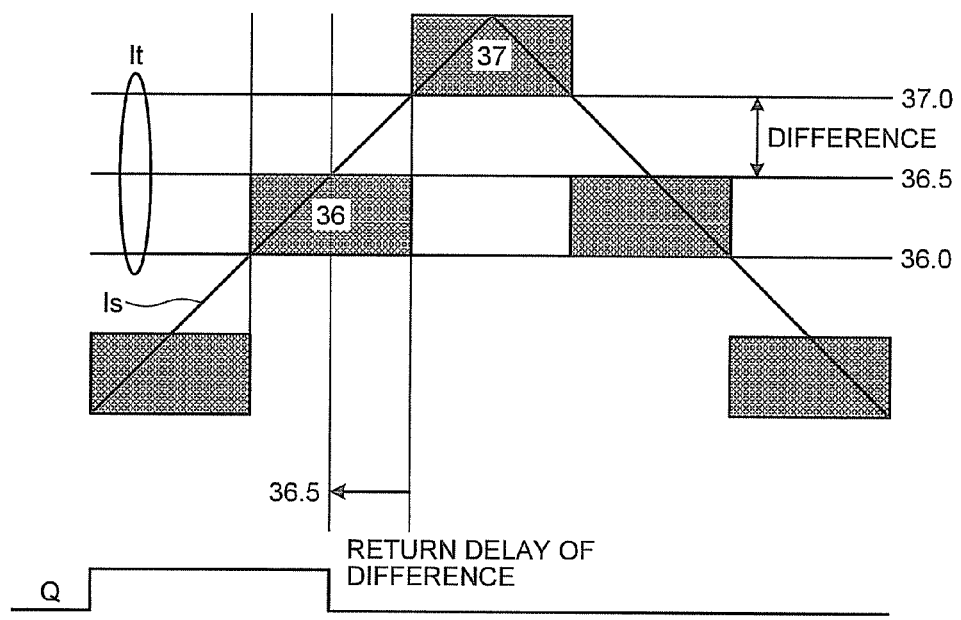
FIG. 8 is a diagram illustrating the relationship between a current detection value Is and a current command value It of the power supply circuit shown in FIG. 7.

FIG. 8 is a diagram illustrating the relationship between the current detection value Is and the current command value It of the power supply circuit shown in FIG. 7.

In FIG. 8, the AD converted value of the detection value Is is a discrete value. For example, when the digital compensation value Ict is 37, the comparison result Re_msb of the comparator 26 rises at the time when the detection value Is is 37. When the flip-flop 28 is reset using the comparison result Re_msb of the comparator 26, the detection value Is is reduced at the time when the detection value Is is 37.

Therefore, in a method of resetting the flip-flop 28 using the comparison result Re_msb of the comparator 26, when the digital compensation value Ict is actually 36.5, an error occurs during the time when the flip-flop 28 is reset by the difference.

In a method of resetting the flip-flop 28 on the basis of the reset signal Re output from the phase shifter 27, for example, even when the digital compensation value Ict is 36.25, the difference ΔIct (0.5) is corrected by the phase shifter 27, and it is possible to improve the temporal resolution of the reset signal Re.

Sixth Embodiment

Figure 9:
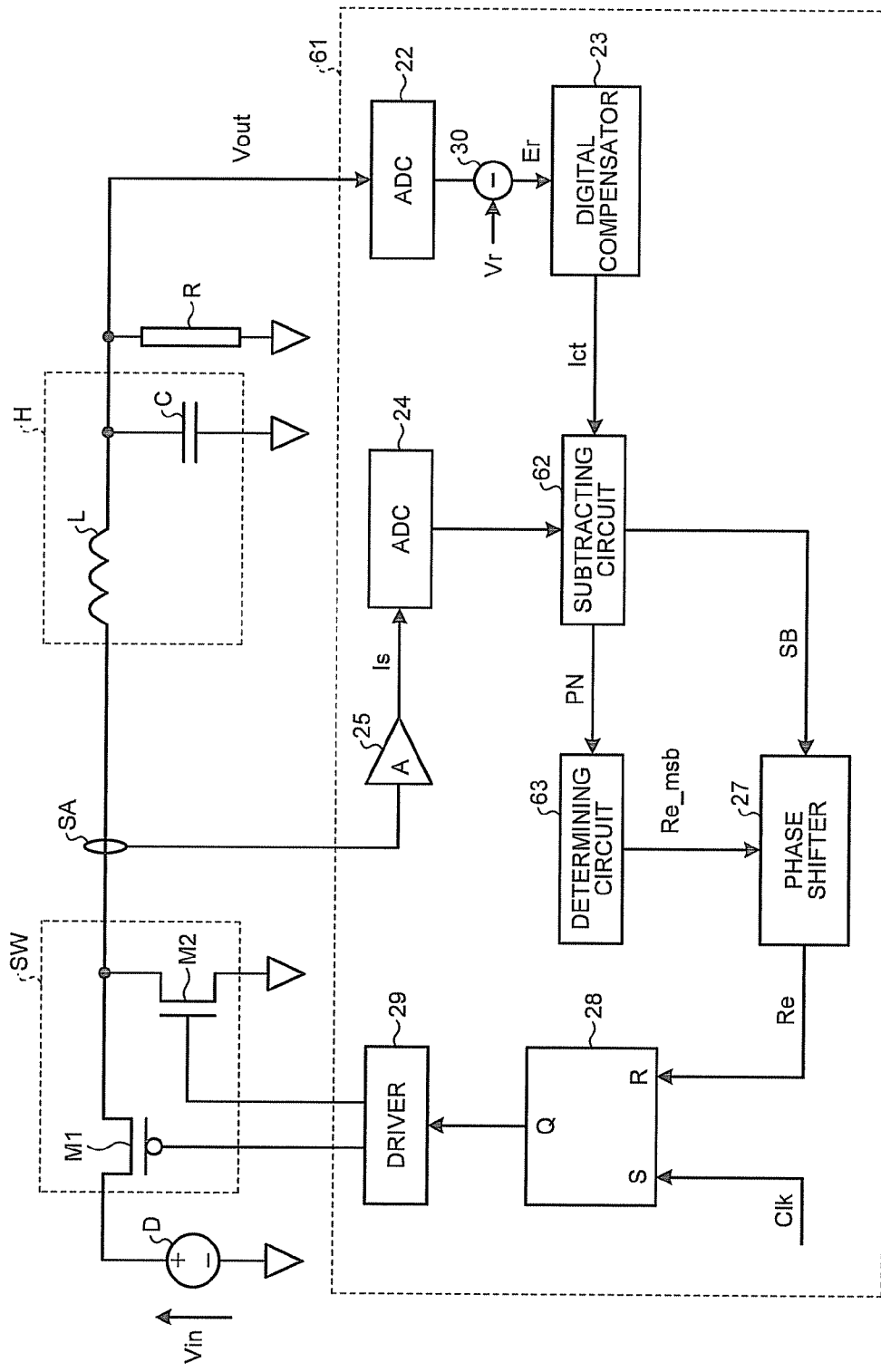
FIG. 9 is a block diagram illustrating the schematic structure of a power supply circuit according to a sixth embodiment.

FIG. 9 is a block diagram illustrating the schematic structure of a power supply circuit according to a sixth embodiment.

In FIG. 9, the power supply circuit includes a switching control unit 61 instead of the switching control unit 51 of the power supply circuit shown in FIG. 7. The switching control unit 61 includes a determining circuit 63 and a subtracting circuit 62 instead of the comparator 26 and the subtracting circuit 52 shown in FIG. 7. The subtracting circuit 62 can subtract the AD converted value of the detection value Is from the digital compensation value Ict. The determining circuit 63 can determine the magnitude relationship between the digital compensation value Ict and the AD converted value of the detection value Is on the basis of the positive or negative sign PN output from the subtracting circuit 62.

The AD converter 22 performs AD conversion on the output voltage Vout of the smoothing circuit H and the subtractor 30 subtracts the reference voltage Vr from the converted value to calculate the error signal Er and outputs the error signal Er to the digital compensator 23. The digital compensator 23 calculates the digital compensation value Ict such that the error signal Er is close to 0 and outputs the digital compensation value Ict to the subtracting circuit 62.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and outputs the converted value to the subtracting circuit 62.

The subtracting circuit 62 subtracts the AD converted value of the detection value Is from the digital compensation value Ict, outputs the subtraction result SB to the phase shifter 27, and outputs the positive or negative sign PN of the subtraction result SB to the determining circuit 63. The determining circuit 63 determines the magnitude relationship between the digital compensation value Ict and the AD converted value of the detection value Is on the basis of the positive or negative sign PN and outputs the determination result to the phase shifter 27. The phase shifter 27 shifts the determination result of the determining circuit 63 on the basis of the subtraction result SB of the subtracting circuit 62 to generate the reset signal Re and outputs the reset signal Re to the reset terminal R of the flip-flop 28.

In this way, the phase shifter 27 can shift the determination result of the determining circuit 63 by the difference between the digital compensation value Ict and the AD converted value of the detection value Is. Therefore, even when the detection value Is is greatly changed, the amount of shift by the phase shifter 27 can follow the detection value Is and it is possible to reduce the oscillation of the output Vout of the power supply circuit operated in the current mode.

Seventh Embodiment

Figure 10:
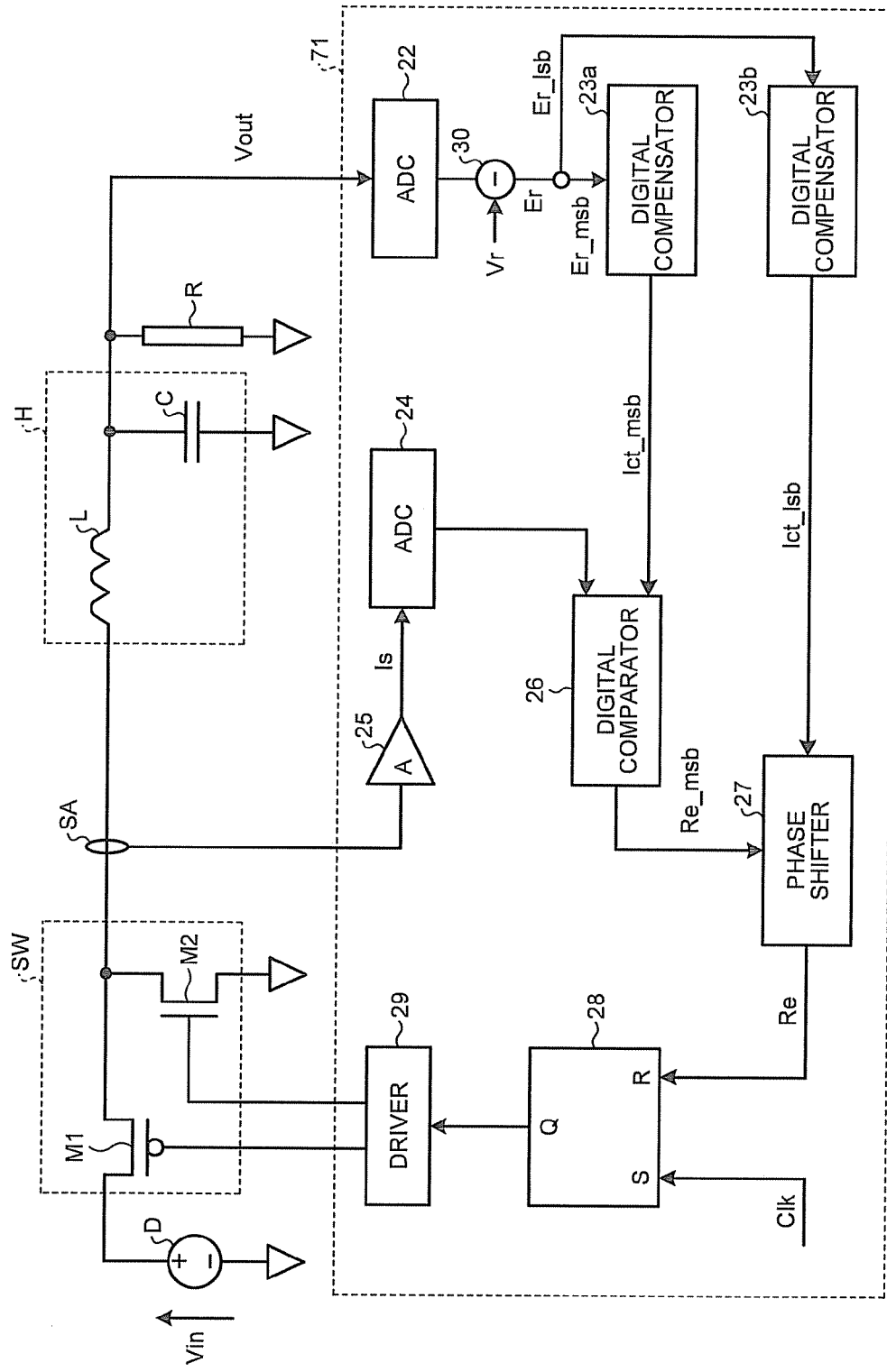
FIG. 10 is a block diagram illustrating the schematic structure of a power supply circuit according to a seventh embodiment.

FIG. 10 is a block diagram illustrating the schematic structure of a power supply circuit according to a seventh embodiment.

In FIG. 10, the power supply circuit includes a switching control unit 71 instead of the switching control unit 31 of the power supply circuit shown in FIG. 4. The switching control unit 71 includes digital compensators 23a and 23b instead of the digital compensator 23 shown in FIG. 4.

The digital compensator 23a can compensate the high order bit Er_msb of the error signal Er to calculate the high order bit Ict_msb of the digital compensation value Ict. The digital compensator 23b can compensate the low order bit Er_lsb of the error signal Er to calculate the low order bit Ict_lsb of the digital compensation value Ict.

The AD converter 22 performs AD conversion on the output voltage Vout of the smoothing circuit H and the subtractor 30 subtracts the reference voltage Vr from the converted value to calculate the error signal Er. The high order bit Er_msb of the error signal Er is output to the digital compensator 23a and the low order bit Er_lsb of the error signal Er is output to the digital compensator 23b.

The digital compensator 23a calculates the high order bit Ict_msb of the digital compensation value Ict such that the high order bit Er_msb of the error signal Er is close to 0 and outputs the high order bit Ict_msb to the comparator 26. The digital compensator 23b calculates the low order bit Ict_lsb of the digital compensation value Ict such that the low order bit Er_lsb of the error signal Er is close to 0 and outputs the low order bit Ict_lsb to the phase shifter 27.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and outputs the converted value to the comparator 26.

The comparator 26 compares the high order bit Ict_msb with the AD converted value of the detection value Is and outputs the comparison result Re_msb to the phase shifter 27. The phase shifter 27 shifts the output timing of the comparison result Re_msb of the comparator 26 on the basis of the low order bit Ict_lsb of the digital compensation value Ict to generate the reset signal Re and outputs the reset signal Re to the reset terminal R of the flip-flop 28.

In this way, it is not necessary to perform DA conversion on the digital compensation value Ict and a DA converter for performing DA conversion on the digital compensation value Ict is not needed. In addition, it is possible to improve the temporal resolution of the reset signal Re and reduce the oscillation of the output Vout of the power supply circuit operated in the current mode while improving the robustness of a circuit.

Eighth Embodiment

Figure 11:
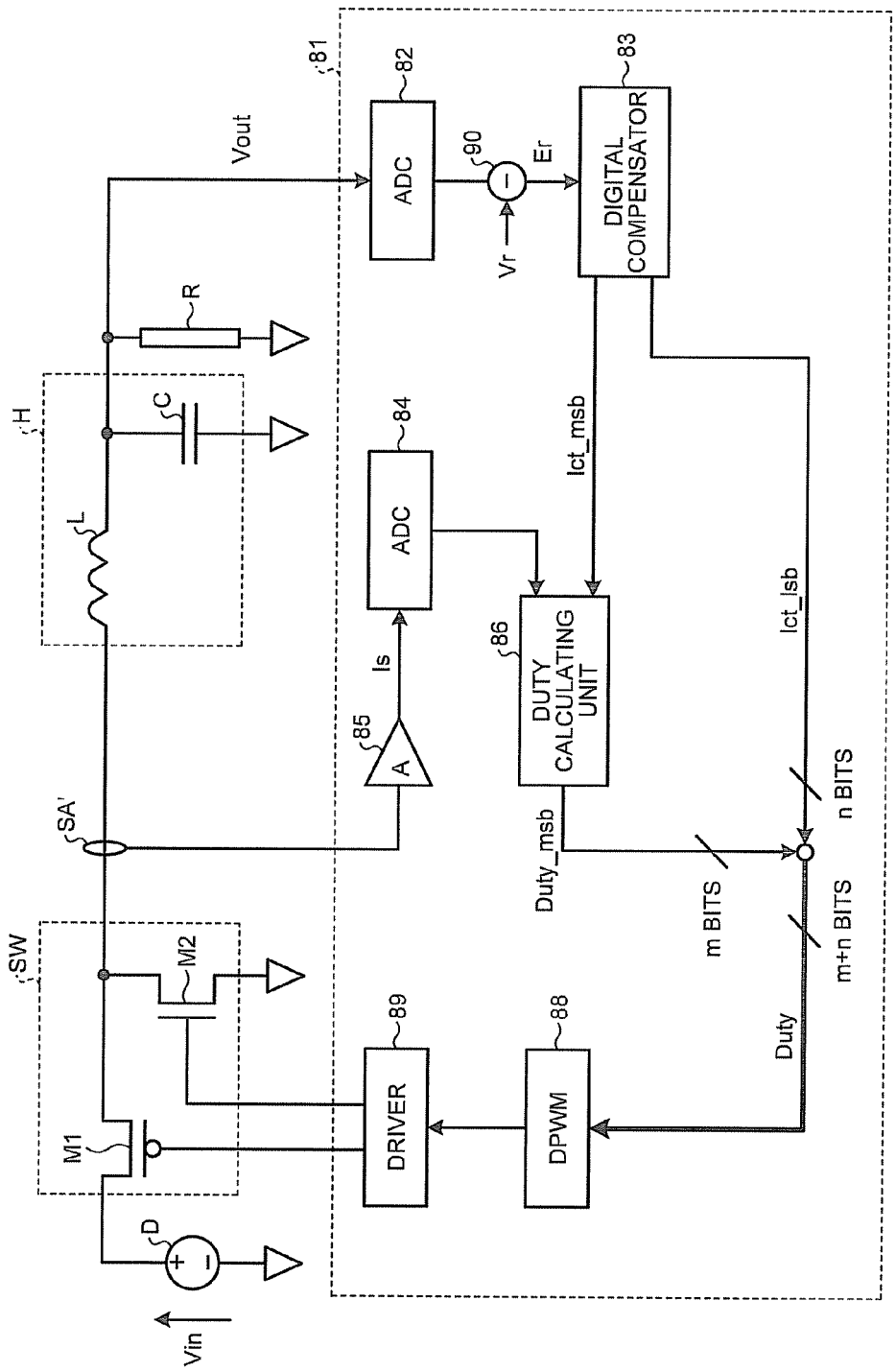
FIG. 11 is a block diagram illustrating the schematic structure of a power supply circuit according to an eighth embodiment.

FIG. 11 is a block diagram illustrating the schematic structure of a power supply circuit according to an eighth embodiment.

In FIG. 11, the power supply circuit includes a switching control unit 81 instead of the switching control unit 31 of the power supply circuit shown in FIG. 4. The power supply circuit includes a current sensor SA' instead of the current sensor SA. The current sensor SA detects the instantaneous value of the current flowing into the smoothing circuit H. However, the current sensor SA' can detect the average value of the current flowing into the smoothing circuit H.

The switching control unit 81 can compare the high order bit Ict_msb of the digital compensation value Ict calculated from the output voltage Vout of the smoothing circuit H with the AD converted value of the detection value Is of the current flowing into the smoothing circuit H, calculate the high order bit Duty_msb of a duty Duty on the basis of the comparison result, set the low order bit Ict_lsb of the digital compensation value Ict to the low order bit Duty_lsb of the duty Duty, and perform PWM control on the switching element SW on the basis of the duty Duty.

The switching control unit 81 includes an AD converter 82 that performs AD conversion on the output voltage Vout of the smoothing circuit H, a subtractor 90 that subtracts the reference voltage Vr from the AD converted output voltage Vout to calculate the error signal Er, a digital compensator 83 that compensates the error signal Er to calculate the digital compensation value Ict, an amplifier 85 that amplifiers the value detected by the current sensor SA' and outputs the detection value Is, an AD converter 84 that performs AD conversion on the detection value Is, a duty calculating unit 86 that calculates the high order bit Duty_msb of the duty Duty on the basis of the comparison result between the high order bit Ict_msb of the digital compensation value Ict and the AD converted value of the detection value Is, a digital PWM control unit 88 that performs digital PWM control on the basis of the high order bit Duty_msb of the duty Duty calculated by the duty calculating unit 86 and the low order bit Ict_lsb of the digital compensation value Ict output from the digital compensation value Ict, and a driver 89 that drives the p-channel field effect transistor M1 and the n-channel field effect transistor M2 on the basis of the output of the digital PWM control unit 88.

The AD converter 82 performs AD conversion on the output voltage Vout of the smoothing circuit H and the subtractor 90 subtracts the reference voltage Vr from the converted value to calculate the error signal Er and outputs the error signal Er to the digital compensator 83. The digital compensator 83 calculates the digital compensation value Ict such that the error signal Er is close to 0. The high order bit Ict_msb of the digital compensation value Ict is output to the duty calculating unit 86 and the low order bit Ict_lsb of the digital compensation value Ict is output to the digital PWM control unit 88.

The current sensor SA' detects the average value of the current flowing into the smoothing circuit H and the amplifier 85 amplifies the value detected by the current sensor SA' to generate the detection value Is and outputs the detection value Is to the AD converter 84. The AD converter 84 performs AD conversion on the detection value Is and outputs the converted value to the duty calculating unit 86.

The duty calculating unit 86 calculates the high order bit Duty_msb of the duty Duty on the basis of the comparison result between the high order bit Ict_msb of the digital compensation value Ict and the AD converted value of the detection value Is and outputs the high order bit Duty_msb to the digital PWM control unit 88.

Before the high order bit Duty_msb of the duty Duty is output to the digital PWM control unit 88, it is joined with the low order bit Ict_lsb of the digital compensation value Ict and the duty Duty is generated and output to the digital PWM control unit 88. At that time, when the number of high order bits Duty_msb of the duty Duty is m (m is a positive integer) and the number of low order bits Ict_lsb of the digital compensation value Ict is n (n is a positive integer), the bit number of the duty Duty is m+n.

The digital PWM control unit 88 performs PWM control on the driver 89 on the basis of the duty Duty to drive the p-channel field effect transistor M1 and the n-channel field effect transistor M2.

In this way, it is not necessary to perform DA conversion on the digital compensation value Ict and a DA converter for performing DA conversion on the digital compensation value Ict is not needed. In addition, it is possible to improve the temporal resolution of the duty Duty and reduce the oscillation of the output Vout of the power supply circuit operated in the current mode while improving the robustness of a circuit.

Ninth Embodiment

Figure 12:
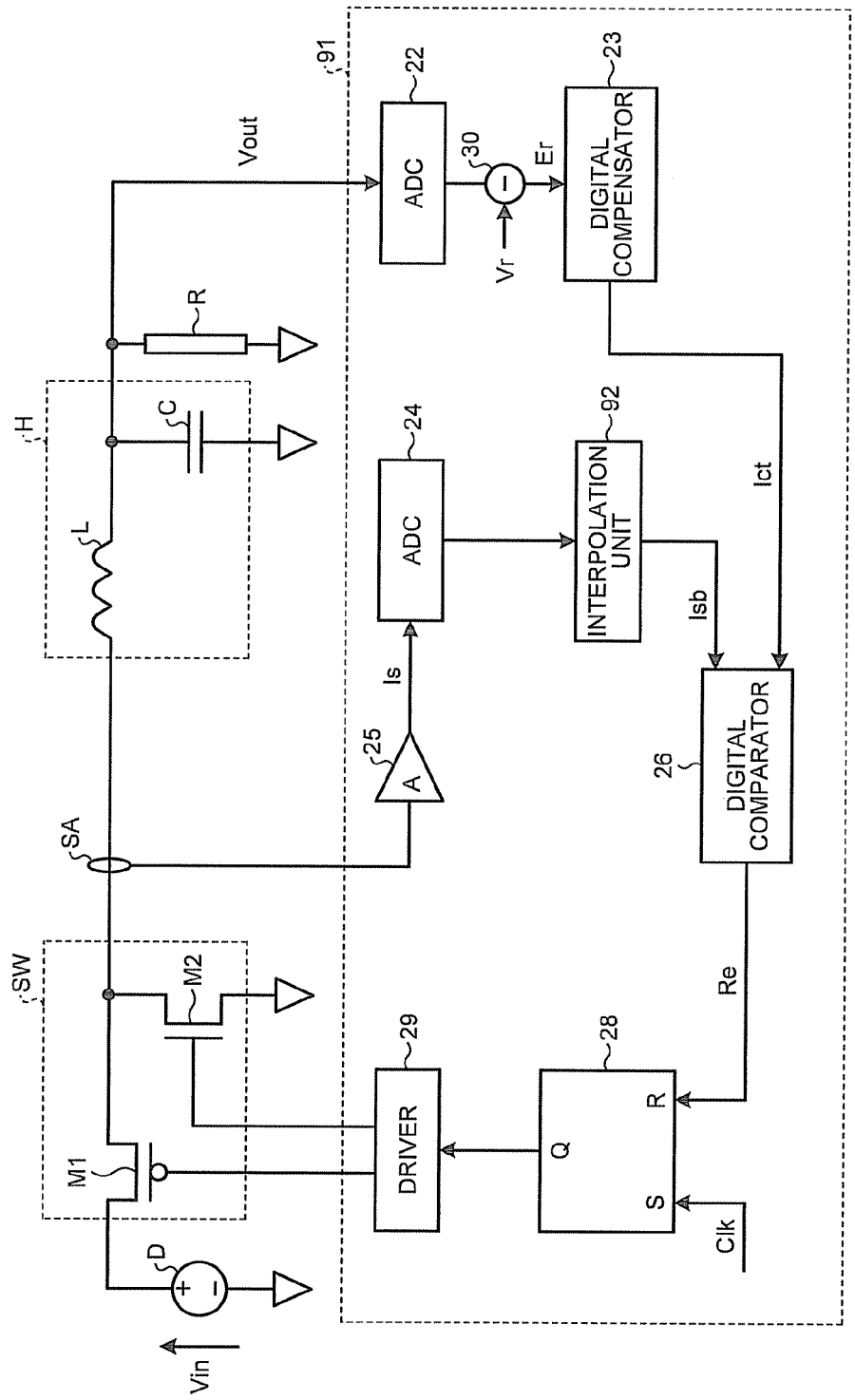
FIG. 12 is a block diagram illustrating the schematic structure of a power supply circuit according to a ninth embodiment.

FIG. 12 is a block diagram illustrating the schematic structure of a power supply circuit according to a ninth embodiment.

In FIG. 12, the power supply circuit includes a switching control unit 91 instead of the switching control unit 21 of the power supply circuit shown in FIG. 3.

The switching control unit 91 can interpolate the detection value Is on the basis of the AD converted value of the detection value Is of the current flowing into the smoothing circuit H and control the switching of the switching element SW on the basis of the comparison result between the digital compensation value Ict calculated from the output voltage Vout of the smoothing circuit H and the interpolated detection value Isb.

The switching control unit 91 additionally includes an interpolation unit 92, as compared to the switching control unit 21 shown in FIG. 3. The interpolation unit 92 can interpolate the detection value Is on the basis of the AD converted value of the detection value Is of the current flowing into the smoothing circuit H.

The AD converter 22 performs AD conversion on the output voltage Vout of the smoothing circuit H and the subtractor 30 subtracts the reference voltage Vr from the converted value to calculate the error signal Er and outputs the error signal Er to the digital compensator 23. The digital compensator 23 calculates the digital compensation value Ict such that the error signal Er is close to 0 and outputs the digital compensation value Ict to the comparator 26.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and the interpolation unit 92 interpolates the detection value Is and outputs the interpolated detection value Isb to the comparator 26.

The comparator 26 compares the digital compensation value Ict with the interpolated detection value Isb to generate the reset signal Re and outputs the reset signal Re to the reset terminal R of the flip-flop 28.

In this way, it is not necessary to perform DA conversion on the digital compensation value Ict and a DA converter for performing DA conversion on the digital compensation value Ict is not needed. In addition, it is possible to improve the temporal resolution of the reset signal Re and reduce the oscillation of the output Vout of the power supply circuit operated in the current mode.

Figure 13:
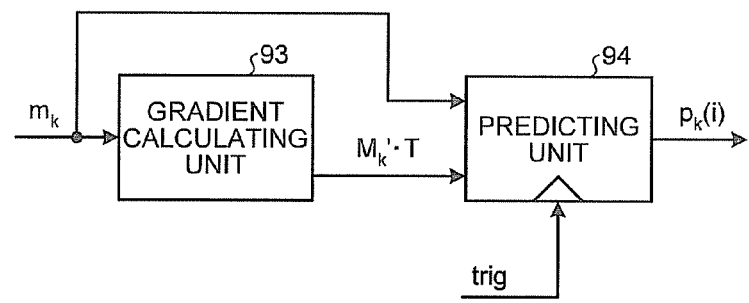
FIG. 13 is a block diagram illustrating an example of an interpolation unit shown in FIG. 12.

FIG. 13 is a block diagram illustrating an example of the interpolation unit shown in FIG. 12.

In FIG. 13, the interpolation unit 92 includes a gradient calculating unit 93 and a predicting unit 94. The gradient calculating unit 93 can calculate a gradient indicating the rate of increase in a measured value $m_k$ over time on the basis of the measured value $m_k$. The predicting unit 94 can predict an interpolation value for interpolating the measured value $m_k$ on the basis of the gradient calculated by the gradient calculating unit 93.

The gradient calculating unit 93 divides the difference between the previous measured value $m_{k-1}$ and the current measured value $m_k$ by the time interval between the previous measured value $m_{k-1}$ and the current measured value $m_k$ to calculate a gradient $m_k'$. Then, the gradient calculating unit 93 multiplies the gradient $m_k'$ by an interpolation period T to calculate the interpolation value. The predicting unit 94 sequentially outputs the measured value $m_k$ and the interpolation value according to a sampling clock trig, thereby outputting an interpolated measured value $p_k(i)$ as the interpolated detection value Isb shown in FIG. 12. The interpolation period T can correspond to the period of the sampling clock trig.

Figure 14:
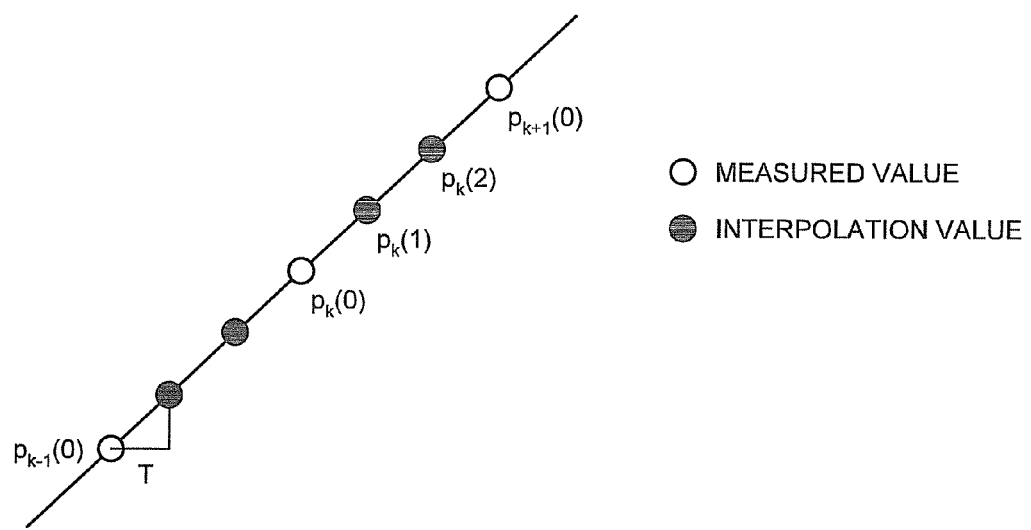
FIG. 14 is a diagram illustrating a method of predicting a measured value using the interpolation unit shown in FIG. 13.

FIG. 14 is a diagram illustrating a method of predicting the measured value using the interpolation unit shown in FIG. 13.

In FIG. 14, for example, when it is assumed that $p_k(0)$ and $p_{k+1}(0)$ are obtained as the measured values, $p_k(1)$ and $p_k(2)$ are interpolated between $p_k(0)$ and $p_{k+1}(0)$.

In general, when $p_k(0)=m_k$ is established, $p_k(i)=p_k(i-1)+T \cdot m_k'$ may be established (where k is an integer equal to or greater than 0 and i is an integer equal to or greater than 1).

Figure 15:
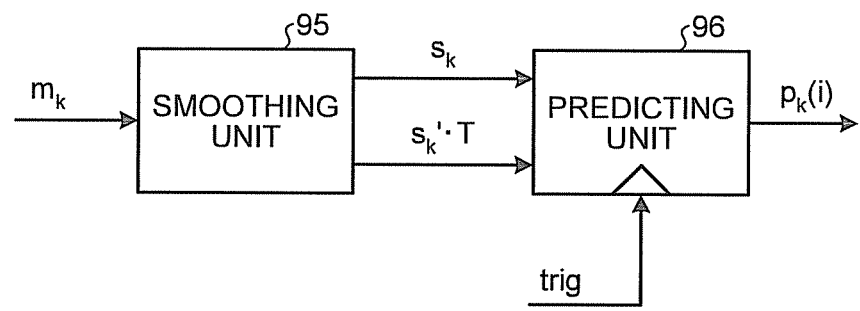
FIG. 15 is a block diagram illustrating another example of the interpolation unit shown in FIG. 12.

FIG. 15 is a block diagram illustrating another example of the interpolation unit shown in FIG. 12.

In FIG. 15, the interpolation unit 92 includes a smoothing unit 95 and a predicting unit 96 instead of the gradient calculating unit 93 and the predicting unit 94. The smoothing unit 95 can calculate a gradient indicating the rate of increase in the measured value $m_k$ over time on the basis of the average value of the measured value $m_k$. The predicting unit 94 can predict an interpolation value for interpolating the average value of the measured value $m_k$ on the basis of the gradient calculated by the smoothing unit 95.

The smoothing unit 95 averages the previous measured value $m_k$ to calculate an average value $s_k$ and calculates a gradient $s_k'$ on the basis of the average value $s_k$. Then, the smoothing unit 95 multiplies the gradient $s_k'$ by the interpolation period T to calculate the interpolation value. The predicting unit 96 sequentially outputs the average value $s_k$ and the interpolation value according to the sampling clock trig, thereby outputting the interpolated measured value $p_k(i)$ as the interpolated detection value Isb shown in FIG. 12.

When $p_k(0)=s_k$ is established, the measured value $p_k(i)$ interpolated on the basis of the average value $s_k$ can be given as $p_k(i)=p_k(i-1)+T \cdot s_k'$.

Tenth Embodiment

Figure 16:
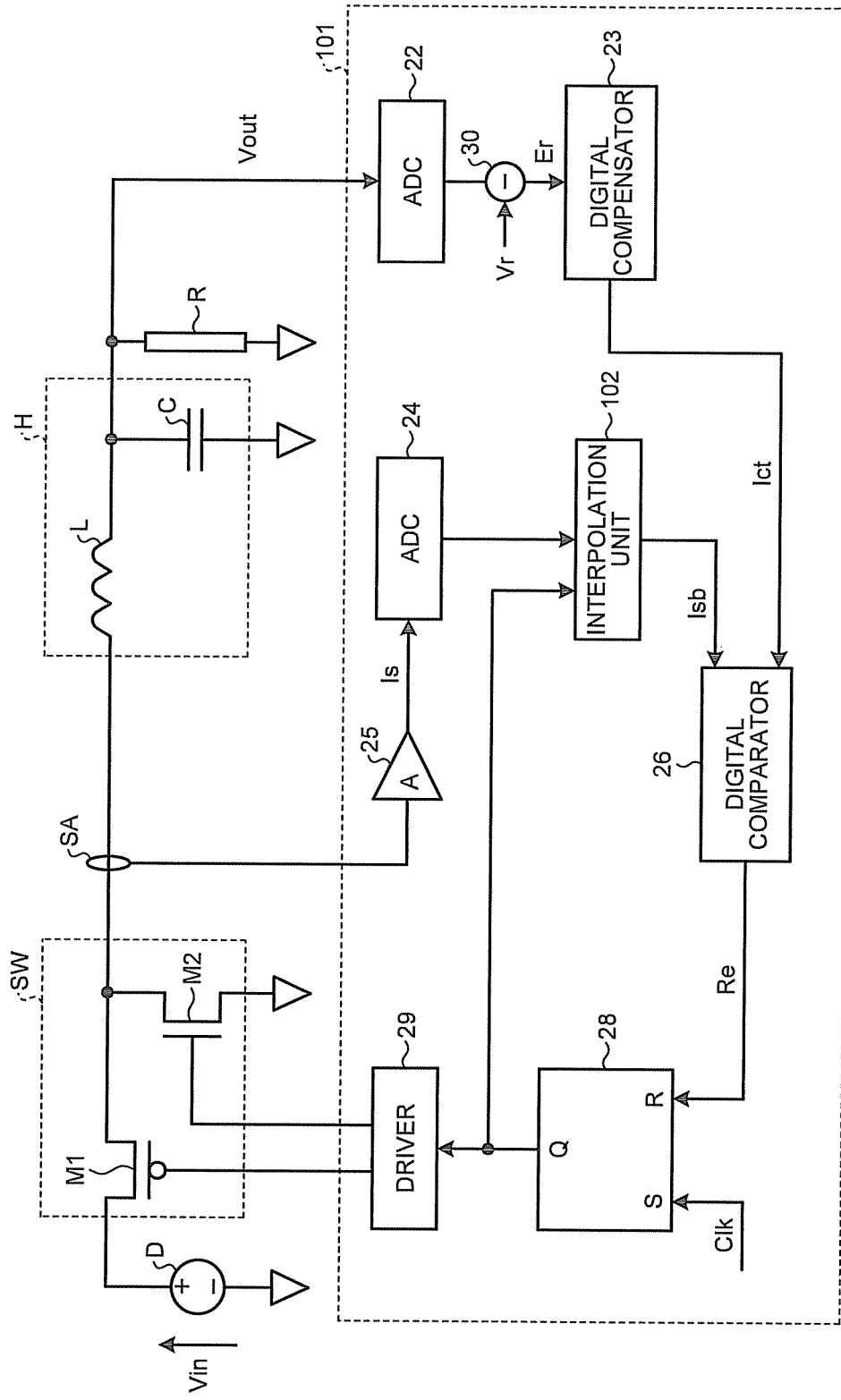
FIG. 16 is a block diagram illustrating the schematic structure of a power supply circuit according to a tenth embodiment.

FIG. 16 is a block diagram illustrating the schematic structure of a power supply circuit according to a tenth embodiment.

In FIG. 16, the power supply circuit includes a switching control unit 101 instead of the switching control unit 91 of the power supply circuit shown in FIG. 12. The switching control unit 101 includes an interpolation unit 102 instead of the interpolation unit 92 shown in FIG. 12. The interpolation unit 102 can interpolate the detection value Is on the basis of the AD converted value of the detection value Is of the current flowing into the smoothing circuit H. At that time, the interpolation unit 102 can reset the interpolation process on the basis of the singular point of the detection value Is. The turnaround point of the detection value Is and the end point of the detection value Is may be exemplified as the singular points of the detection value Is.

Figure 17:
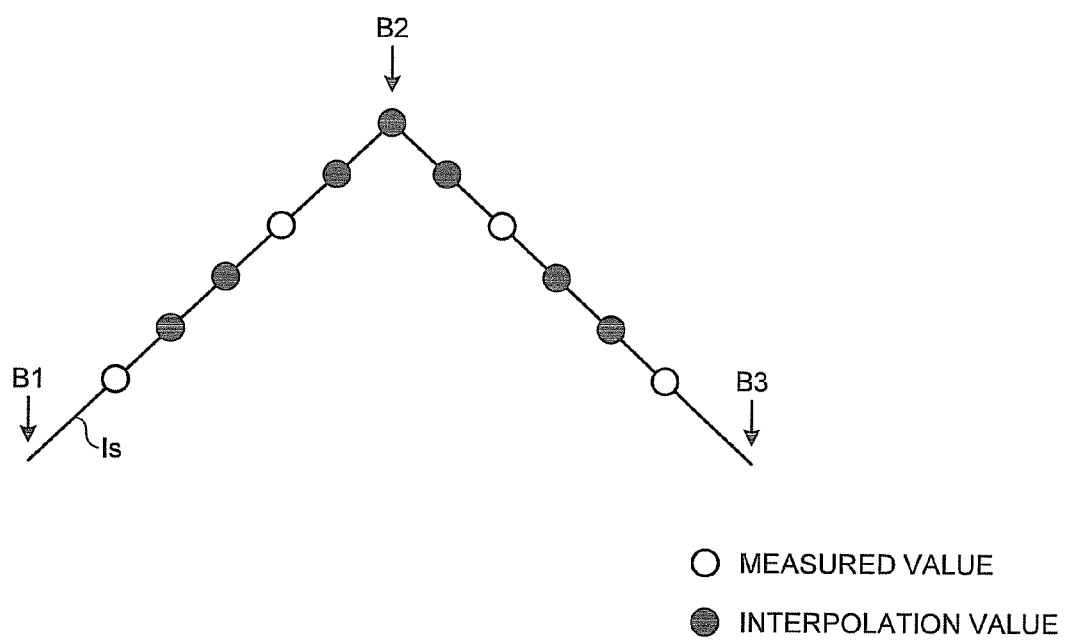
FIG. 17 is a diagram illustrating a method of predicting a measured value using an interpolation unit shown in FIG. 16.

FIG. 17 is a diagram illustrating a method of predicting the measured value using the interpolation unit shown in FIG. 16.

In FIG. 17, the interpolation unit 102 performs the same interpolation process as the interpolation unit 92 shown in FIG. 12. When the singular points B1 to B3 of the detection value Is are detected, the interpolation unit 102 resets the interpolation process and resumes the interpolation process from the singular points B1 to B3.

In this way, it is possible to improve the temporal resolution of the reset signal Re while reducing the prediction error of the interpolation value at the singular points B1 to 33 and reduce the oscillation of the output Vout of the power supply circuit operated in the current mode.

Eleventh Embodiment

Figure 18:
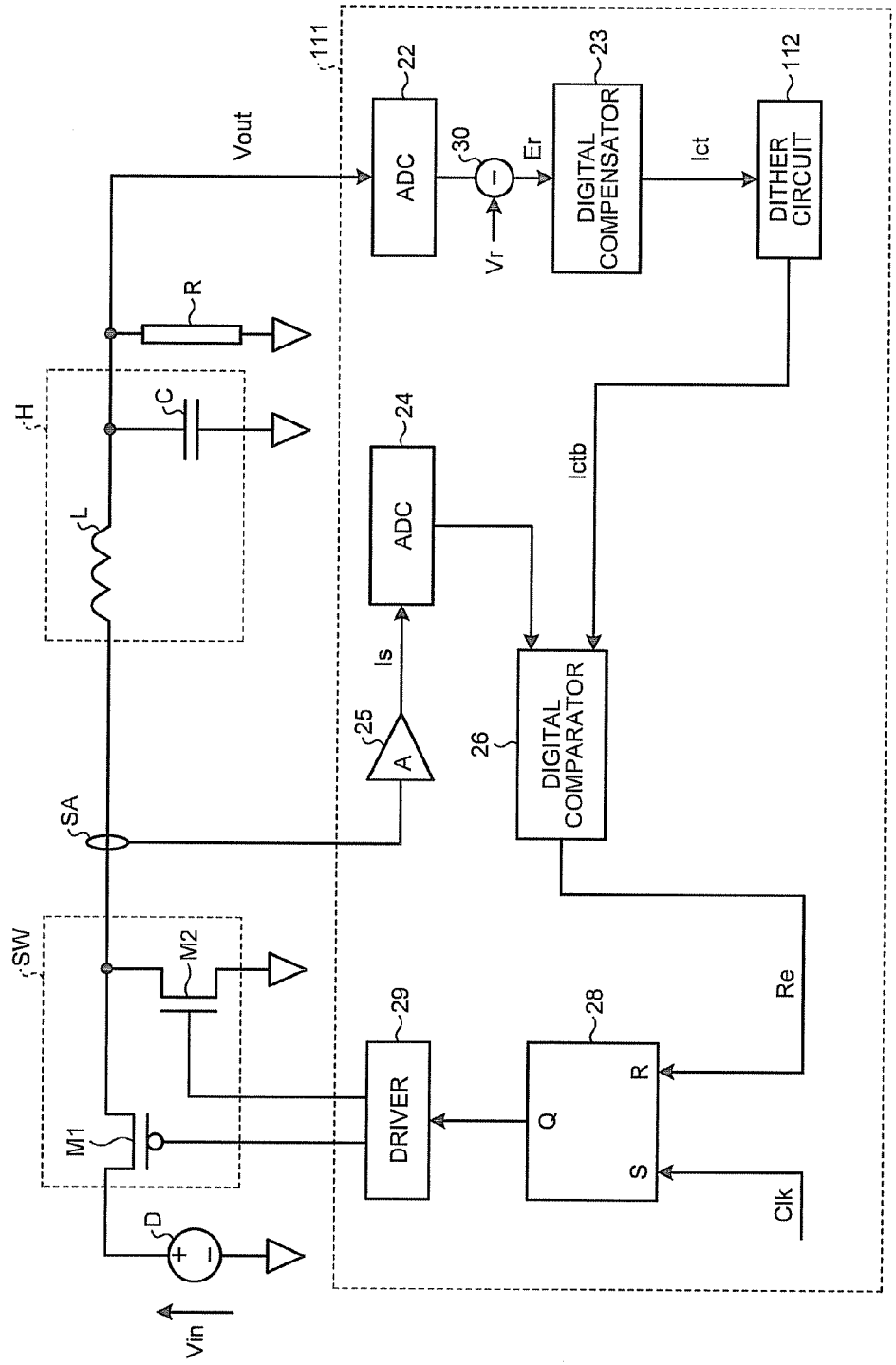
FIG. 18 is a block diagram illustrating the schematic structure of a power supply circuit according to an eleventh embodiment.
Figure 19A:
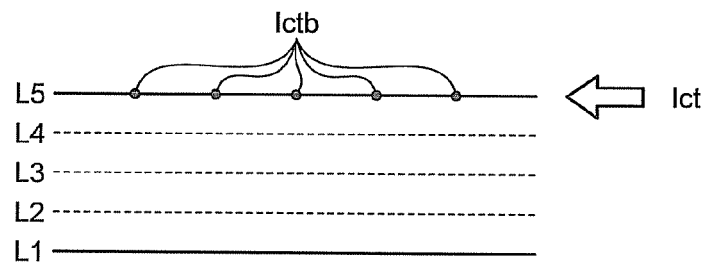
FIGS. 19A to 19E are diagrams illustrating the operation of a dither circuit 112 shown in FIG. 18.
Figure 19B:
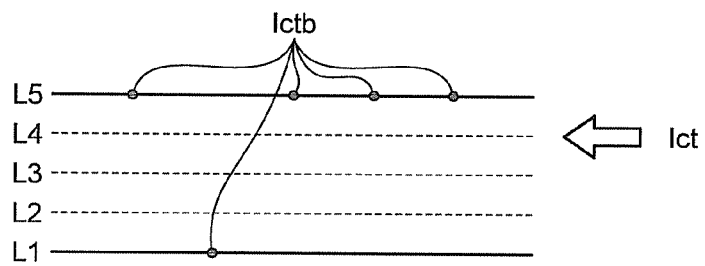
Figure 19C:
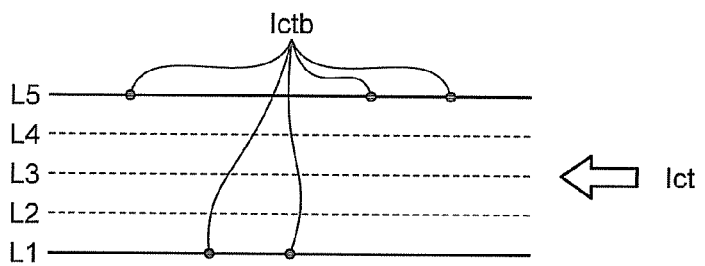
Figure 19D:
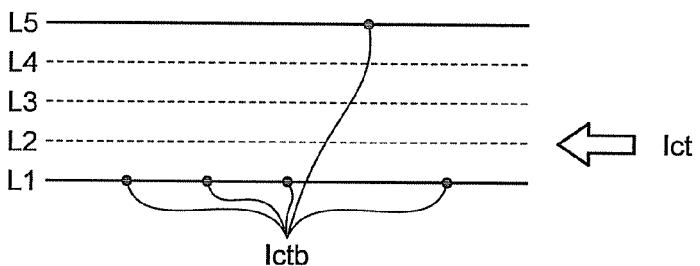
Figure 19E:
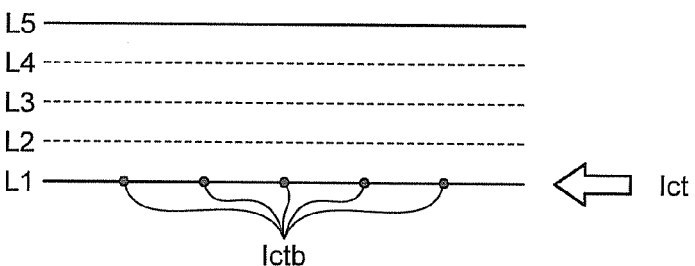

FIG. 18 is a block diagram illustrating the schematic structure of a power supply circuit according to an eleventh embodiment.

In FIG. 18, the power supply circuit includes a switching control unit 111 instead of the switching control unit 21 of the power supply circuit shown in FIG. 3.

The switching control unit 111 can generate a time series combination of control signals on the basis of the digital compensation value Ict calculated from the output voltage Vout of the smoothing circuit H and control the switching of the switching element SW on the basis of the comparison result between a control signal Ictb and the AD converted value of the detection value Is of the current flowing into the smoothing circuit H.

The switching control unit 111 additionally includes a dither circuit 112, as compared to the switching control unit 21 shown in FIG. 3. The dither circuit 112 generates a time series combination of the control signals Ictb on the basis of the digital compensation value Ict.

The AD converter 22 performs AD conversion on the output voltage Vout of the smoothing circuit H and the subtractor 30 subtracts the reference voltage Vr from the converted value to generate the error signal Er and outputs the error signal Er to the digital compensator 23. The digital compensator 23 calculates the digital compensation value Ict such that the error signal Er is closed to 0 and outputs the digital compensation value Ict to the dither circuit 112. The dither circuit 112 generates the control signal Ictb on the basis of the digital compensation value Ict and outputs the control signal Ictb to the comparator 26.

The current sensor SA detects the current flowing into the smoothing circuit H and the amplifier 25 amplifies the value detected by the current sensor SA to generate the detection value Is and outputs the detection value Is to the AD converter 24. The AD converter 24 performs AD conversion on the detection value Is and outputs the converted value to the comparator 26.

The comparator 26 compares the control signal Ictb with the AD converted value of the detection value Is to generate the reset signal Re and outputs the comparison result to the reset terminal R of the flip-flop 28.

In this way, it is not necessary to perform DA conversion on the digital compensation value Ict and a DA converter for performing DA conversion on the digital compensation value Ict is not needed. In addition, it is possible to improve the temporal resolution of the reset signal Re and reduce the oscillation of the output Vout of the power supply circuit operated in the current mode.

FIGS. 19A to 19E are diagrams illustrating the operation of the dither circuit 112 shown in FIG. 18. In FIGS. 19A to 19E, for example, the control signal Ictb has values L1 and L5.

For example, when the control signal Ictb has a constant value L5, L5 is obtained as the digital compensation value Ict. For example, the control signal Ictb has the values L5 and L1 substantially at a ratio of 3:1, L4 is obtained as the digital compensation value Ict. For example, the control signal Ictb has the values L5 and L1 substantially at a ratio of 1:1, L3 is obtained as the digital compensation value Ict. For example, the control signal Ictb has the values L5 and L1 substantially at a ratio of 1:3, L2 is obtained as the digital compensation value Ict. For example, when the control signal Ictb has a constant value L1, L1 is obtained as the digital compensation value Ict.

The values L1, L2, L3, L4, and L5 are obtained from the values L1 and L5, and it is possible to improve the resolution of the control signal Ictb without increasing the accuracy of the AD converter 22.

Other Embodiments

Figure 20:
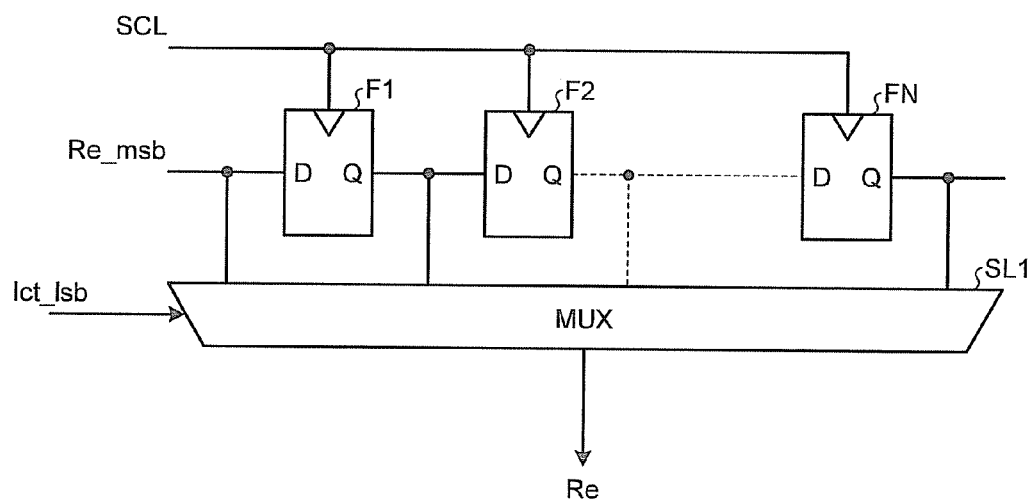
FIG. 20 is a block diagram illustrating an example of a phase shifter applied to the power supply circuit.

FIG. 20 is a block diagram illustrating an example of a phase shifter applied to the power supply circuit.

In FIG. 20, the phase shifter includes flip-flops F1 to FN (N is a positive integer) and a selector SL1. The flip-flops F1 to FN are connected in N stages, and the output of each of the flip-flops F1 to FN is input to the selector SL1.

The comparison result Re_msb of the comparator 16 or 26 is sequentially transmitted to the flip-flops F1 to FN according to a sampling clock SCL. The selector SL1 selects any one of the outputs of the flip-flops F1 to FN on the basis of the low order bit Ict_lsb of the digital compensation value Ict. In this way, the reset signal Re is output.

Figure 21:
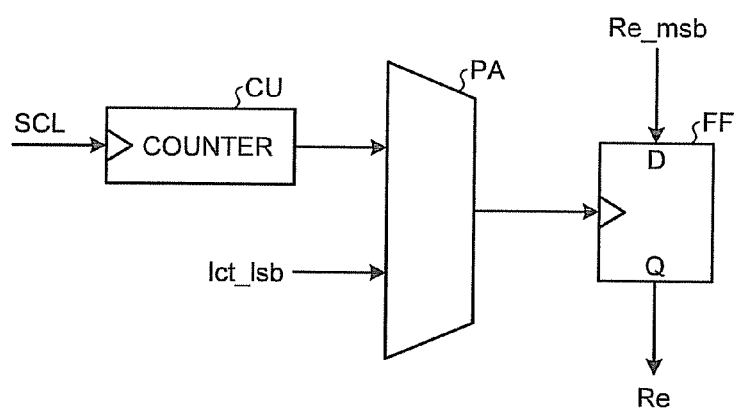
FIG. 21 is a block diagram illustrating another example of the phase shifter applied to the power supply circuit.

FIG. 21 is a block diagram illustrating another example of the phase shifter applied to the power supply circuit.

In FIG. 21, the phase shifter includes a counter CU, a comparator PA, and a flip-flop FF. The counter CU counts the sampling clock SCL and outputs the count result to the comparator PA. The comparator PA compares the count result of the counter CU with the low order bit Ict_lsb of the digital compensation value Ict. When the count result of the counter CU is equal to the low order bit Ict_lsb of the digital compensation value Ict, the comparison result Re_msb of the comparator 16 or 26 is input to the flip-flop FF and the reset signal Re is output.

Figure 22:
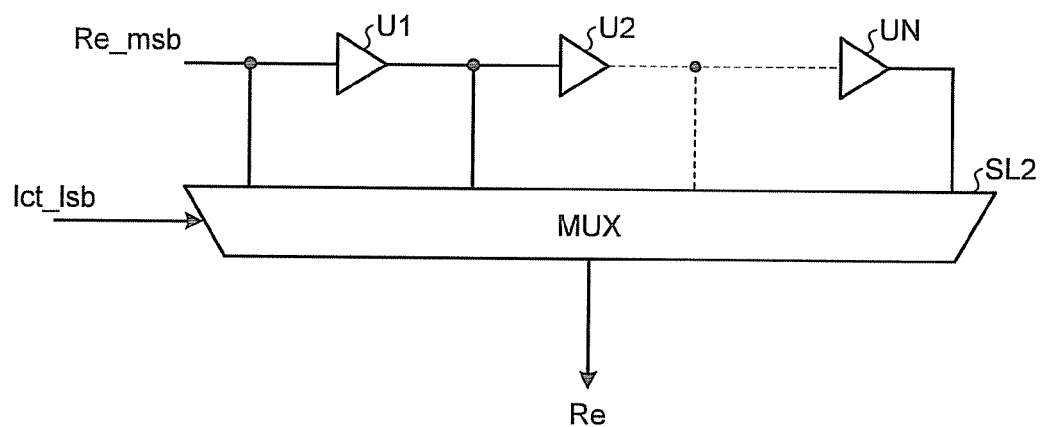
FIG. 22 is a block diagram illustrating still another example of the phase shifter applied to the power supply circuit.

FIG. 22 is a block diagram illustrating still another example of the phase shifter applied to the power supply circuit.

In FIG. 22, the phase shifter includes buffers U1 to UN and a selector SL2. The buffers U1 to UN are connected in N stages and the output of each of the buffers U1 to UN is input to the selector SL2.

The comparison result Re_msb of the comparator 16 or 26 is sequentially transmitted through the buffers U1 to UN. The selector SL2 selects any one of the outputs of the buffers U1 to UN on the basis of the low order bit Ict_lsb of the digital compensation value Ict. In this way, the reset signal Re is output.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply circuit comprising:
a switching element that divides a direct current;
a smoothing circuit that smoothes the direct current divided by the switching element; and
a switching control unit that compares a DA converted value of the high order bit of a digital compensation value calculated from an output voltage of the smoothing circuit with a detection value of a current flowing from the switching element into the smoothing circuit and controls the switching of the switching element on the basis of a signal obtained by shifting a rising or falling edge of the comparison result by a finite time calculated by using the low order bit of the digital compensation value.

2. The power supply circuit according to claim 1, wherein the switching control unit includes:
an AD converter that performs AD conversion on the output voltage of the smoothing circuit;
an error calculating circuit that calculates an error signal from the AD converted output voltage of the AD converter on the basis of a reference voltage;
a digital compensator that compensates the error signal to calculate the digital compensation value;
a DA converter that performs DA conversion on the high order bit of the digital compensation value;
a current detecting circuit that outputs the detection value of the current flowing into the smoothing circuit;
a comparator that compares the DA converted value of the high order bit of the digital compensation value with the detection value;
a phase shifter that shifts the phase of the comparison result of the comparator on the basis of the low order bit of the digital compensation value; and
a driver that drives the switching element on the basis of the output result of the phase shifter.

3. A power supply circuit comprising:
a switching element that divides a direct current;
a smoothing circuit that smoothes the direct current divided by the switching element; and
a switching control unit that compares the high order bit of a digital compensation value calculated from an output voltage of the smoothing circuit with an AD converted value of a detection value of a current flowing from the switching element into the smoothing circuit and controls the switching of the switching element on the basis of a signal obtained by shifting a rising or falling edge of the comparison result by a finite time calculated by using the low order bit of the digital compensation value.

4. The power supply circuit according to claim 3, wherein the switching control unit includes:
a first AD converter that performs AD conversion on the output voltage of the smoothing circuit;
an error calculating circuit that calculates an error signal from the AD converted output voltage of the first AD converter on the basis of a reference voltage;
a digital compensator that compensates the error signal to calculate the digital compensation value;
a current detecting circuit outputs the detection value of the current flowing into the smoothing circuit;
a second AD converter that performs AD conversion on the detection value;
a digital comparator that compares the high order bit of the digital compensation value with the AD converted value of the detection value;
a phase shifter that shifts the phase of the comparison result of the digital comparator on the basis of the low order bit of the digital compensation value; and
a driver that drives the switching element on the basis of the output result of the phase shifter.

5. The power supply circuit according to claim 3, wherein the switching control unit includes:
a first AD converter that performs AD conversion on the output voltage of the smoothing circuit;
an error calculating circuit that calculates an error signal from the AD converted output voltage of the first AD converter on the basis of a reference voltage;
a first digital compensator that compensates the error signal to calculate the high order bit of the digital compensation value;
a second digital compensator that compensates the error signal to calculate the low order bit of the digital compensation value;
a current detecting circuit that outputs the detection value of the current flowing into the smoothing circuit;

a second AD converter that performs AD conversion on the detection value;
a digital comparator that compares the high order bit of the digital compensation value with the AD converted value of the detection value;
a phase shifter that shifts the phase of the comparison result of the digital comparator on the basis of the low order bit of the digital compensation value; and
a driver that drives the switching element on the basis of the output result of the phase shifter.

6. A power supply circuit comprising:
a switching element that divides a direct current;
a smoothing circuit that smoothes the direct current divided by the switching element; and
a switching control unit that compares a digital compensation value calculated from an output voltage of the smoothing circuit with a digital detection value of a current flowing from the switching element into the smoothing circuit and controls the switching of the switching element on the basis of a signal obtained by shifting a rising or falling edge of the comparison result by a finite time calculated by using the subtraction result between the digital compensation value and the digital detection value.

7. The power supply circuit according to claim 6,
wherein the switching control unit includes:
a first AD converter that performs AD conversion on the output voltage of the smoothing circuit;
an error calculating circuit that calculates an error signal from the AD converted output voltage of the first AD converter on the basis of a reference voltage;
a digital compensator that compensates the error signal to calculate the digital compensation value;
a current detecting circuit that outputs the detection value of the current flowing into the smoothing circuit;
a second AD converter that performs AD conversion on the detection value;
a digital comparator that compares the high order bit of the digital compensation value with the AD converted value of the detection value;
a subtractor that subtracts the AD converted value of the detection value from the high order bit of the digital compensation value;
a phase shifter that shifts the phase of the comparison result of the digital comparator on the basis of the low order bit of the digital compensation value and the subtraction result of the subtractor; and
a driver that drives the switching element on the basis of the output result of the phase shifter.

8. The power supply circuit according to claim 7,
wherein the phase shifter shifts the output timing of the comparison result of the digital comparator by a difference between the high order bit of the digital compensation value and the AD converted value of the detection value in addition to the low order bit of the digital compensation value.

9. The power supply circuit according to claim 6,
wherein the switching control unit includes:
a first AD converter that performs AD conversion on the output voltage of the smoothing circuit;
an error calculating circuit that calculates an error signal from the AD converted output voltage of the first AD converter on the basis of a reference voltage;
a digital compensator that compensates the error signal to calculate the digital compensation value;
a current detecting circuit that outputs the detection value of the current flowing into the smoothing circuit;
a second AD converter that performs AD conversion on the detection value;
a digital comparator that compares the digital compensation value with the AD converted value of the detection value;
a subtracting circuit that subtracts the AD converted value of the detection value from the digital compensation value;
a phase shifter that shifts the phase of the comparison result of the digital comparator on the basis of the subtraction result of the subtracting circuit; and
a driver that drives the switching element on the basis of the output result of the phase shifter.

10. The power supply circuit according to claim 6,
wherein the switching control unit includes:
a first AD converter that performs AD conversion on the output voltage of the smoothing circuit;
an error calculating circuit that calculates an error signal from the AD converted output voltage of the first AD converter on the basis of a reference voltage;
a digital compensator that compensates the error signal to calculate the digital compensation value;
a current detecting circuit that outputs the detection value of the current flowing into the smoothing circuit;
a second AD converter that performs AD conversion on the detection value;
a subtracting circuit that subtracts the AD converted value of the detection value from the digital compensation value;
a determining circuit that determines the magnitude relationship between the digital compensation value and the AD converted value of the detection value on the basis of a positive or negative sign output from the subtracting circuit;
a phase shifter that shifts the determination result of the determining circuit on the basis of the subtraction result of the subtracting circuit; and
a driver that drives the switching element on the basis of the output result of the phase shifter.

11. A power supply circuit comprising:
a switching element that divides a direct current; a smoothing circuit that smoothes the direct current divided by the switching element; and a switching control unit that compares the high order bit of a digital compensation value calculated from an output voltage of the smoothing circuit and an AD converted value of a detection value of a current flowing from the switching element into the smoothing circuit, calculates the high order bit of a duty on the basis of the comparison result, sets the low order bit of the digital compensation value to the low order bit of the duty, performs PWM control on the switching element on the basis of the duty and shifts a rising or falling edge of a driving signal for the switching element by a finite time calculated by using the duty value.

12. The power supply circuit according to claim 11,
wherein the switching control unit includes:
a first AD converter that performs AD conversion on the output voltage of the smoothing circuit;
an error calculating circuit that calculates an error signal from the AD converted output voltage of the first AD converter on the basis of a reference voltage;
a digital compensator that compensates the error signal to calculate the digital compensation value;
a current detecting circuit that outputs the detection value of the current flowing into the smoothing circuit;

a second AD converter that performs AD conversion on the detection value;

a duty calculating unit that calculates the high order bit of the duty on the basis of the comparison result between the high order bit of the digital compensation value and the AD converted value of the detection value;

a digital PWM control unit that performs digital PWM control on the basis of the high order bit of the duty calculated by the duty calculating unit and the low order bit of the digital compensation value output from the digital compensator; and a driver that drives the switching element on the basis of the output of the digital PWM control unit.

13. A power supply circuit comprising:

a switching element that divides a direct current;

a smoothing circuit that smoothes the direct current divided by the switching element; and a switching control unit that measures AD converted values of a current flowing from the switching element into the smoothing circuit, and calculates their interpolated values on the basis of a gradient of the AD converted values, and controls the switching of the switching element on the basis of the comparison result between a digital compensation value calculated from an output voltage of the smoothing circuit and the interpolated value.

14. The power supply circuit according to claim 13, wherein the switching control unit includes:

a first AD converter that performs AD conversion on the output voltage of the smoothing circuit;

an error calculating circuit that calculates an error signal from the AD converted output voltage of the first AD converter on the basis of a reference voltage;

a digital compensator that compensates the error signal to calculate the digital compensation value;

a current detecting circuit that outputs the detection value of the current flowing into the smoothing circuit;

a second AD converter that performs AD conversion on the detection value; an interpolation unit that interpolates the detection value on the basis of the AD converted value of the detection value;

a digital comparator that compares the digital compensation value with the interpolation result of the detection value; and a driver that drives the switching element on the basis of the comparison result of the digital comparator.

15. The power supply circuit according to claim 14, wherein the interpolation unit includes:

a gradient calculating unit that calculates a gradient indicating the rate of increase in the detection value over time on the basis of the detection value; and a predicting unit that predicts an interpolation value for interpolating the detection value on the basis of the gradient calculated by the gradient calculating unit.

16. The power supply circuit according to claim 14, wherein the interpolation unit includes:

a smoothing unit that calculates a gradient indicating the rate of increase in the detection value over time on the basis of the average value of the detection value; and a predicting unit that predicts an interpolation value for interpolating the detection value on the basis of the gradient calculated by the smoothing unit.

17. A power supply circuit comprising:

a switching element that divides a direct current; a smoothing circuit that smoothes the direct current divided by the switching element; and a switching control unit that generates a digital compensation value calculated from an output voltage of the smoothing circuit, generates a time series combination of control signals on the basis of the digital compensation value, and controls the switching of the switching element on the basis of the comparison result between the control signal and an AD converted value of a detection value of a current flowing from the switching element into the smoothing circuit, and shifts a rising and falling edge of a driving signal for the switching element by a finite time calculated by using a duty value, wherein the digital compensation value is generated so as to come close to a ratio of values of the time series combination of control signals.

18. The power supply circuit according to claim 17, wherein the switching control unit includes:

a first AD converter that performs AD conversion on the output voltage of the smoothing circuit;

an error calculating circuit that calculates an error signal from the AD converted output voltage of the first AD converter on the basis of a reference voltage;

a digital compensator that compensates the error signal to calculate the digital compensation value;

a current detecting circuit that outputs the detection value of the current flowing into the smoothing circuit;

a second AD converter that performs AD conversion on the detection value;

a dither circuit that generates the time series combination of the control signals on the basis of the digital compensation value;

a digital comparator that compares the control signal with the AD converted value of the detection value; and a driver that drives the switching element on the basis of the comparison result of the digital comparator.

* * * * *